United States Patent
Ishimura

(10) Patent No.: US 8,713,291 B2
(45) Date of Patent: Apr. 29, 2014

(54) CACHE MEMORY CONTROL DEVICE, SEMICONDUCTOR INTEGRATED CIRCUIT, AND CACHE MEMORY CONTROL METHOD

(75) Inventor: Naoya Ishimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 697 days.

(21) Appl. No.: 12/926,455

(22) Filed: Nov. 18, 2010

(65) Prior Publication Data

US 2011/0125969 A1    May 26, 2011

(30) Foreign Application Priority Data

Nov. 25, 2009  (JP) ................................. 2009-267990

(51) Int. Cl.
*G06F 9/00* (2006.01)
*G06F 13/00* (2006.01)

(52) U.S. Cl.
USPC .......................................... 712/225; 711/118

(58) Field of Classification Search
None
See application file for complete search history.

(56) References Cited

U.S. PATENT DOCUMENTS

| | | | |
|---|---|---|---|
| 5,878,237 A | 3/1999 | Olarig | |
| 5,878,252 A * | 3/1999 | Lynch et al. | 712/225 |
| 6,516,393 B1 | 2/2003 | Fee et al. | |
| 2004/0103250 A1 | 5/2004 | Alsup | |

FOREIGN PATENT DOCUMENTS

| | | |
|---|---|---|
| EP | 0 637 799 | 2/1995 |
| JP | 3-25558 | 2/1991 |
| JP | 5-257859 | 10/1993 |
| JP | 10-111798 | 4/1998 |
| JP | 2002-182976 | 6/2002 |

OTHER PUBLICATIONS

Extended European Search Report for corresponding European Patent Application No. 10191665.8, issued on Jun. 10, 2011.
Japanese Office Action mailed Oct. 29, 2013 for corresponding Japanese Patent Application No. 2009-267990.

* cited by examiner

*Primary Examiner* — Andrew Caldwell
*Assistant Examiner* — William B Partridge
(74) *Attorney, Agent, or Firm* — Staas & Halsey LLP

(57) ABSTRACT

A cache memory control device includes cache memories shared by arithmetic processing units, buses shared by the arithmetic processing units to transfer data, an instruction execution unit that accesses the cache memories to execute an access instruction from the arithmetic processing unit, and transfers data from the cache memory to the bus, an instruction feeding unit that feeds the access instruction to the instruction execution unit while inhibiting feeding of a subsequent access instruction for the cache memory accessed in the preceding access instruction in an execution period of the preceding access instruction and inhibiting feeding of a subsequent access instruction using the same bus as the preceding access instruction in a predetermined period, and a timing control unit that, depending on the type of the subsequent access instruction, controls the instruction executing unit to delay the transfer of the data from the cache memory to the bus.

6 Claims, 16 Drawing Sheets

CACHE MEMORY CONTROL DEVICE, SEMICONDUCTOR INTEGRATED CIRCUIT, AND CACHE MEMORY CONTROL METHOD

CROSS-REFERENCE TO RELATED APPLICATION

This application is based upon and claims the benefit of priority of the prior Japanese Patent Application No. 2009-267990, filed on Nov. 25, 2009, the entire contents of which are incorporated herein by reference.

FIELD

The embodiments discussed herein are directed to a cache memory control device, a semiconductor integrated circuit, and a cache memory control method.

BACKGROUND

Large scale integrated circuits (LSI) that are kind of semiconductor integrated circuits, such as a central processing unit (CPU) that includes a processor core (hereinafter, "core") that performs arithmetic processing, include a cache memory in order to increase the process speed. Furthermore, a semiconductor integrated circuit is connected to a main storage device, which is a main memory, and includes a memory access controller (MAC) that controls data storage of the cache memory and the main storage device. The cache memory serves as a memory accessible at a higher speed compared to the main storage device that is the main memory and stores only data that the CPU frequently uses out of the data that is stored in the main storage device.

When performing various arithmetic processes, the core first notifies the cache memory of a data read request in order to request data from the cache memory. When the data is in the cache memory, i.e., there is a cache hit, the cache memory transfers the data to the core. In contrast, when the data is not in the cache memory, i.e., there is a cache miss, but the data is in the main storage device, the cache memory reads the data from the main storage device and stores the data. The core then accesses the cache memory again and acquires the data from the cache memory.

When a cache control unit of the semiconductor integrated circuit detects a data read request from the core and then a cache miss occurs, the cache control unit issues a move-in request to the MAC. Upon detecting the move-in request, the MAC reads data corresponding to the move-in request, i.e., data corresponding to the cache miss, from the main storage device and transfers the data to the cache memory, and the cache memory stores the data. Furthermore, after the data is stored in the cache memory, upon detecting again a data read request from the core, the cache control unit reads the data, which is required by the core, from the cache memory and transfers the data to the core.

In recent single-core semiconductor integrated circuits, an increase in power consumption is becoming a problem that cannot be ignored and it is thought that performance improvement is reaching its limit. Such problems are dealt with by developing multi-core semiconductor integrated circuits, each includes multiple cores, and multi-bank semiconductor integrated circuits, each with a cache memory and a main storage unit that are divided into multiple banks. Such a semiconductor integrated circuit includes multiple cores, multiple MACs, multi-bank cache memories, and a control unit that controls data transfer in the semiconductor integrated circuit.

In a semiconductor integrated circuit, multiple cores access multi-bank cache memories and data is transferred from the multi-bank cache memories to each core. The multiple cores significantly improve arithmetic processing performance in the semiconductor integrated circuit. Furthermore, multiple banks increase the efficiency with which the multiple cores access the multiple cache memories so that performance in supplying data from the cache memories to the cores significantly improves. For example, Japanese Laid-open Patent Publication No. 10-111798, Japanese Laid-open Patent Publication No. 5-257859, and Japanese Laid-open Patent Publication No. 3-025558 each discloses a technique related to cache memory control.

In such a semiconductor integrated circuit, one core and one cache memory are connected to each other via a bus to ensure stable data transfer between cores and cache memories. However, if a large number of cores and cache memories are used, it is required to arrange buses corresponding to the number of cores and caches and thus the bus structure becomes complicated. This leads to a risk that the data transfer efficiency significantly decreases between cores and cache memories in the circuit.

SUMMARY

According to one aspect of an embodiment of the present invention, a cache memory control device, includes a plurality of cache memories shared by a plurality of arithmetic processing units to store data from the plurality of arithmetic processing unit, a plurality of buses that is shared by the arithmetic processing units and transfers data read from the plurality of cache memories to the arithmetic processing units, an instruction execution unit that accesses each of the plurality of cache memories in accordance with cycles time-divided for each of the plurality of cache memories, executes an access instruction from the arithmetic processing unit to access data stored in each of the plurality of cache memories, and transfers data read from each of the cache memories to the bus corresponding to the arithmetic processing unit, an instruction feeding unit that receives an access instruction from the arithmetic processing unit and feeds the access instruction to the instruction execution unit while inhibiting feeding of a subsequent access instruction accessing a same cache memory with a preceding access instruction in a period required to execute the preceding access instruction and inhibiting feeding of the subsequent access instruction for which a same bus as that used for the preceding access instruction is used in a predetermined period shorter than the period required to execute the preceding access instruction, and a timing control unit that controls the instruction executing unit to delay a timing in which transfer of data read from each of the cache memories in accordance with the subsequent access instruction to the bus is started in the period required to execute the preceding access instruction when the instruction feeding unit feeds the subsequent access instruction.

According to another aspect of the present invention, a cache memory control method that is performed by a cache memory control device, the cache memory control method includes accessing each of plurality of cache memories shared by arithmetic processing units according to cycles time-divided for each of the plurality of cache memories to execute an access instruction from one of the arithmetic processing units to one of the cache memories, transferring data read from each of the cache memories to one of buses corresponding to the arithmetic processing unit, the buses being shared by the arithmetic processing units to transfer the data read from the plurality of cache memories to the arithmetic processing unit, receiving an access instruction from the arithmetic processing unit to the cache memory, feeding the access instruction to an instruction execution unit while inhibiting feeding of a subsequent access instruction accessing a same cache memory with a preceding access instruction in a period required to execute the preceding access instruction and inhibiting feeding of the subsequent access instruction for which a same bus as that used for the preceding access instruction is used, in a predetermined period shorter than the period required to execute the preceding access instruction, and when the subsequent access instruction, for which a same bus with the preceding access instruction is used is fed in the period required to execute the preceding access instruction, controlling to delay a start timing of the transfer of data read from the cache memory in accordance with the subsequent access instruction to the bus.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT(S)

Preferred embodiments of the present invention will be explained with reference to accompanying drawings.

Figure 1:
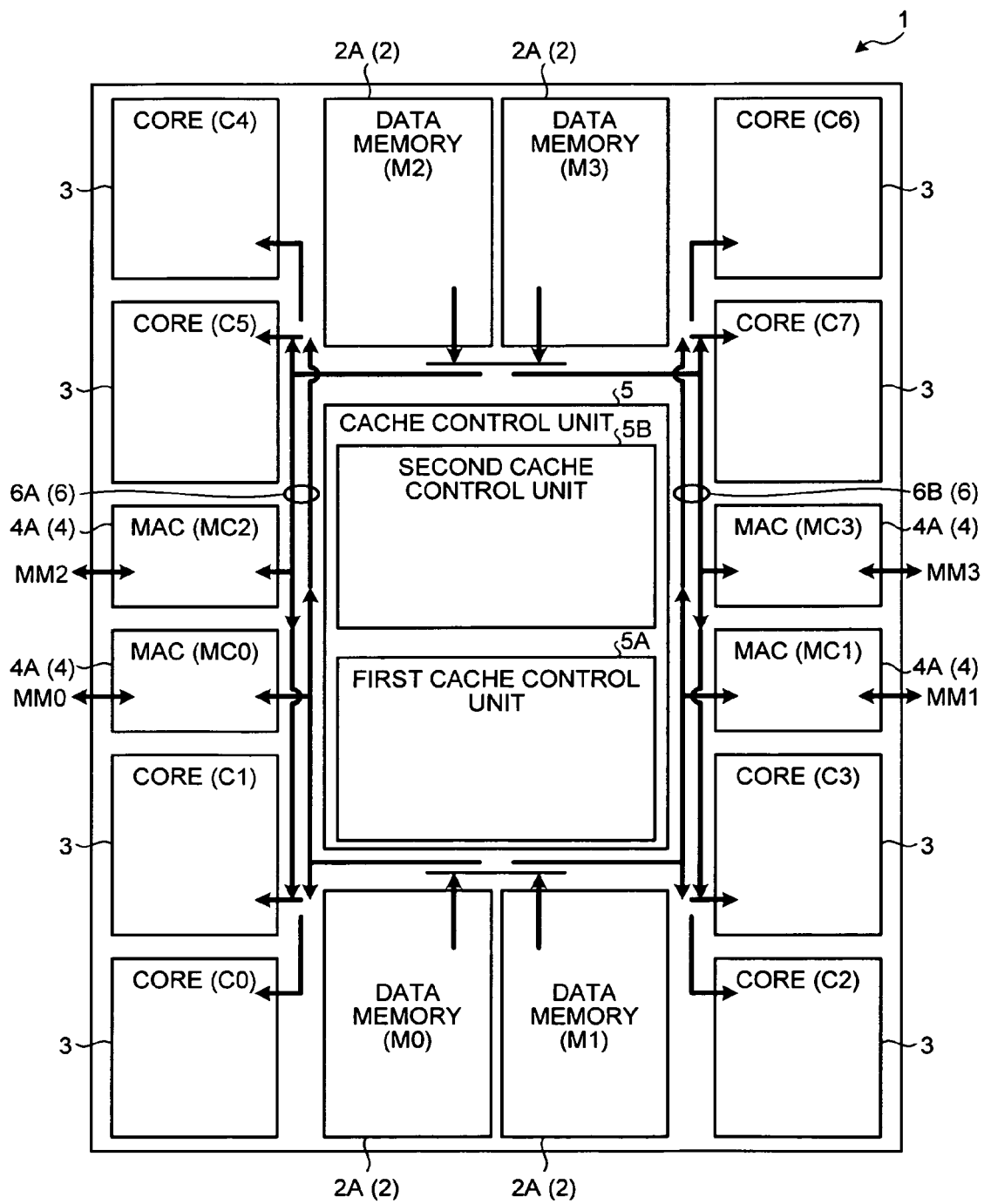
FIG. 1 is a block diagram of a configuration of an LSI according to a first embodiment of the present invention.

FIG. 1 is a block diagram of a configuration of an LSI according to a first embodiment of the present invention. An LSI 1 illustrated in FIG. 1 includes a cache memory 2, a core 3, a memory access controller (hereinafter, "MAC") 4, a cache control unit 5, and a data bus 6. The cache memory 2 is connected to the core 3, the MAC 4, the cache control unit 5, and the data bus 6. The cache memory 2 temporarily stores data that is stored in a main storage device (not illustrated) and is used for arithmetic processing that is performed by the core 3.

When the main storage device is divided into, for example, four bank memories (MM0 to MM3), the cache memory 2 is divided into four data memories 2A (M0 to M3) in association with the bank memories (MM0 to MM3). The cache memory 2 is, for example, a random access memory (hereinafter, "RAM"). The core 3 is connected to, for example, the data bus 6 and the cache control unit 5. The core 3 is an arithmetic processing unit that performs various arithmetic processes in accordance with the data in the cache memory 2. The core 3 includes, for example, eight cores 3 (C0 to C7).

The MAC 4 is connected to the cache control unit 5 and controls the bank memories (MM0 to MM3). The MAC 4 is divided into four MACs 4A (MC0 to MC3) in association with the bank memories (MM0 to MM3). For example, MC0 of the MAC 4 controls the bank memory (MM0) that is associated with the data memory 2A (M0), and MC3 of the MAC 4 controls the bank memory (MM3) that is associated with the data memory 2A (M3).

The cache control unit 5 is connected to the core 3, the MAC 4, the data bus 6, and the main storage device. The cache control unit 5 controls data transfer between the core 3, the MAC 4, the data bus 6, and the main storage device. On the LSI 1, for example, eight cores 3 (C0 to C7), four data memories 2A (M0 to M3), and four MACs 4A (MC0 to MC3) are arranged on the outer edge of the board and the cache control unit 5 is arranged at the center of the board.

The cache control unit 5 includes a first cache control unit 5A and a second cache control unit 5B. The first cache control unit 5A controls the data memories 2A (M0 and M1) and the MACs 4A (MC0 and MC1). The second cache control unit 5B controls the data memories 2A (M2 and M3) and the MACs 4A (MC2 and MC3).

The data bus 6 transfers data between the multiple cores 3 and the data memories 2A. For example, the LSI 1 includes a first data bus 6A and a second data bus 6B. The first data bus 6A transfers data, for example, from the data memories 2A to the multiple cores 3 (C0, C1, C4, and C5). The second data bus 6B transfers data, for example, from the data memories 2A to the multiple cores 3 (C2, C3, C6, and C7).

Figure 2:
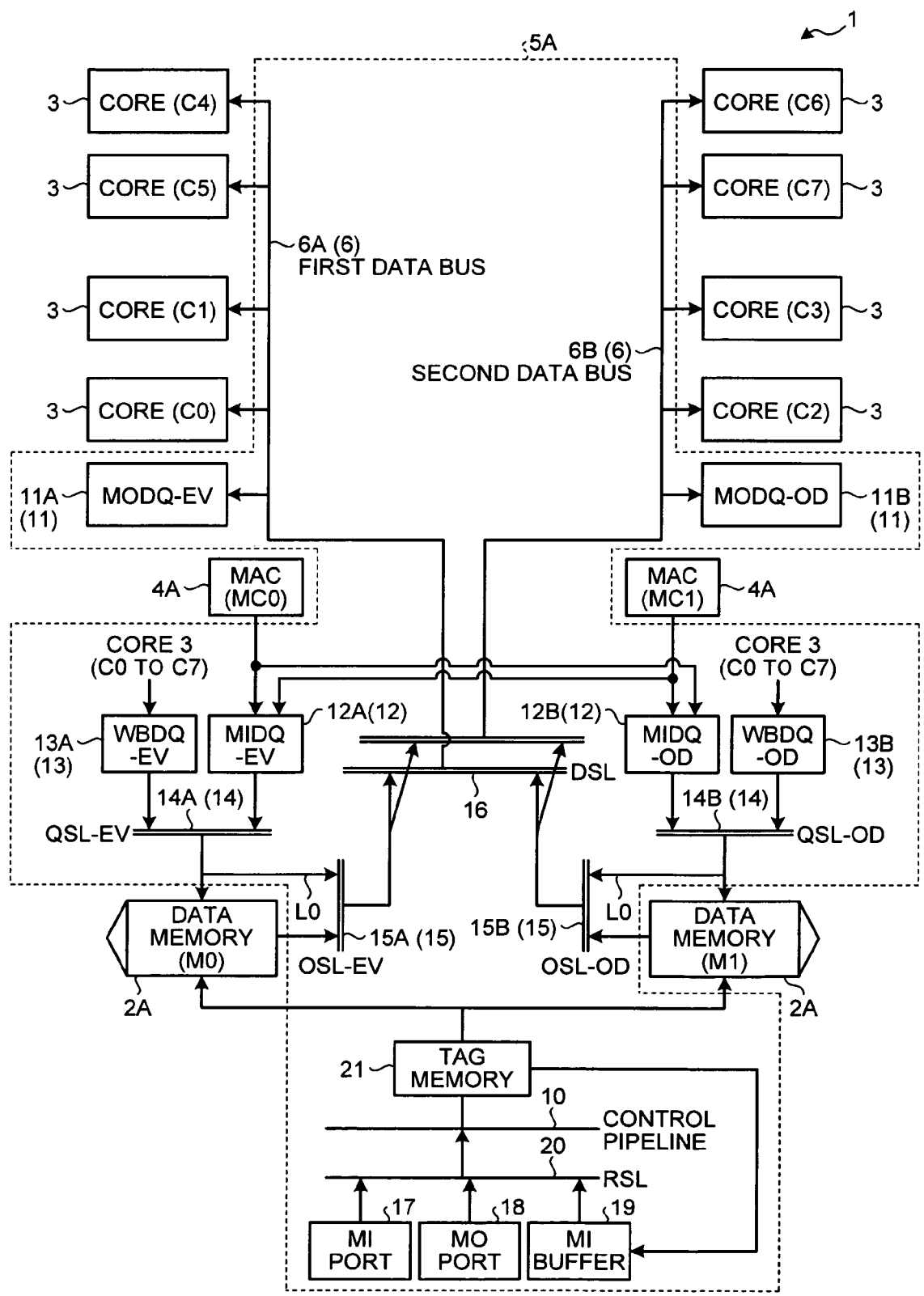
FIG. 2 is a block diagram of a configuration of a first cache control unit according to the first embodiment.

A configuration of the first cache control unit 5A will be described below. FIG. 2 is a block diagram of a configuration of the first cache control unit 5A according to the first embodiment. The first cache control unit 5A includes a control pipeline 10, a move-out data queue (hereinafter, "MODQ") 11, and a move-in data queue (hereinafter, "MIDQ") 12. The first cache control unit 5A further includes a write-back data queue (hereinafter, "WBDQ") 13, a queue selector (hereinafter, "QSL") 14, and a connection line L0. The first cache control unit 5A further includes an output selector (hereinafter, "OSL") 15 and a data selector (hereinafter, "DSL") 16. The first cache control unit 5A further includes a move-in port (hereinafter, "MI port") 17, a move-out port (hereinafter, "MO port") 18, and a move-in buffer (hereinafter, "MI buffer") 19. The first cache control unit 5A further includes a request selector (hereinafter, "RSL") 20 and a tag memory 21.

The control pipeline 10 receives fed pipe instructions, with respect to the data memories A (M0 and M1), during two types of cycles, i.e., EVEN cycles and ODD cycles. The EVEN cycle is used when accessing the data memory 2A (M0) and the ODD cycle is used when accessing the data memory 2A (M1).

The MODQ 11 is connected to the data bus 6 and the MAC 4. The MODQ 11 stores move-out data. The MODQ 11 includes an EVEN-cycle MODQ-EV 11A and an ODD-cycle MODQ-OD 11B. The MODQ-EV 11A is connected to the first data bus 6A and the MODQ-OD 11B is connected to the second data bus 6B. Move-out data is data that is deleted from the cache memory 2.

The MIDQ 12 is connected to the QSL 14 and the MAC 4. The MIDQ 12 stores move-in data. The MIDQ 12 includes an EVEN-cycle MIDQ-EV 12A and an ODD-cycle MIDQ-OD 12B. The MIDQ-EV 12A and the MIDQ-OD 12B are connected to the MACs 4A (MC0 and MC1). Move-in data is data that is newly registered in the cache memory 2.

The WBDQ 13 is connected to the core 3 and the QSL 14. The WBDQ 13 includes an EVEN-cycle WBDQ-EV 13A and an ODD-cycle WBDQ-OD 13B. Write-back data is data that is already registered in a cache memory (not illustrated) in the core 3 and is to be returned to the cache memory 2 or the main storage device.

The QSL 14 is connected to the data memories 2A, the WBDQ 13, the MIDQ 12, and the connection line L0. The QSL 14 outputs output data from the WBDQ 13 or output data from the MIDQ 12 to the data memories 2A and the connection line L0. The QSL 14 includes an EVEN-cycle QSL-EV 14A and an ODD-cycle QSL-OD 14B. The QSL-EV 14A outputs output data from the WBDQ-EV 13A or output data from the MIDQ-EV 12A to the data memory 2A (M0) and the connection line L0. The QSL-OD 14B outputs output data from the WBDQ-OD 13B or output data from the MIDQ-OD 12B to the data memory 2A (M1) and the connection line L0.

The connection line L0 is connected to the QSL 14 and the OSL 15. The connection line L0 serves as a transmission line that directly connects the QSL-EV 14A and an OSL-EV 15A or directly connects the QSL-OD 14B and an OSL-OD 15B. The connection line L0 directly outputs corresponding data, for example, from the QSL-EV 14A to the OSL-EV 15A. The connection line L0 directly outputs corresponding data, for example, from the QSL-OD 14B to the OSL-OD 15B.

The OSL 15 is connected to the data memory 2A (M0), the connection line L0, and the DSL 16. The OSL 15 outputs the output data from the data memory 2A or output data from the QSL 14, which is output via the connection line L0, to the DSL 16. The OSL 15 includes an EVEN-cycle OSL-EV 15A and an ODD-cycle OSL-OD 15B. The OSL-EV 15A outputs output data from the data memory 2A (M0) or output data from the QSL-EV 14A, which is output via the connection line L0, to the DSL 16. The OSL-OD 15B outputs the output data from the data memory 2A (M1) or the output data from the QSL-OD 14B, which is output via the connection line L0, to the DSL 16.

The first data bus 6A is connected to the cores 3 (C0, C1, C4, C5) and the MODQ-EV 11A. The second data bus 6B is connected to the cores 3 (C2, C3, C6, C7) and the MODQ-OD 11B. The DSL 16 is connected to the OSL-EV 15A and the OSL-OD 15B. The DSL 16 outputs output data from the OSL-EV 15A or the output data from the OSL-OD 15B to the data bus 6 (the first data bus 6A or the second data bus 6B).

The MI port 17 is connected to the cores 3 and the RSL 20. Upon detecting a move-in request from the core 3, the MI port 17 issues a READ (hereinafter, "RD"). The MI port 17 is provided with respect to each core 3 (C0 to C7) and the MI port 17 includes eight MI ports (MIP0 to MIP7). An RD is a pipe instruction that corresponds to a data read request from the core 3.

The MO port 18 is connected to the cores 3 and the RSL 20. Upon detecting a move-out request from the core 3, the MO port 18 issues a BYPASS MOVE-OUT (hereinafter, "BPMO"). The MO port 18 is provided with respect to each core 3 (C0 to C7). The MO port 18 includes eight MO ports 18 (MOP0 to MOP7). A BPMO is a pipe instruction for storing write-back data, which is stored in the WBDQ 13, in the MODQ 11.

The MI buffer 19 is connected to the MACs 4 and the RSL 20. The MI buffer 19 outputs a request to the MAC 4 and issues a pipe instruction in response to a request from the MAC 4. The MI buffer 19 is arranged for each MAC 4 (MC0 and MC1). The pipe instruction from the MI buffer 19 is a MOVE-OUT REPLACE (hereinafter, "MORP") for requesting deletion of corresponding data from the cache memory 2 or a MOVE-IN (hereinafter, "MVIN") for requesting registration of corresponding data in the cache memory 2.

The RSL 20 is connected to the MI port 17, the MO port 18, the MI buffer 19, and the control pipeline 10. The RSL 20 feeds a pipe instruction during a corresponding cycle (the EVEN cycle or the ODD cycle) to the control pipeline 10. The tag memory 21 is connected to the control pipeline 10 and the data memories 2A. The tag memory 21 is arranged for each data memory 2A and manages the address of corresponding data in the data memory 2A. The tag memory 21 is, for example, a part of the cache memory 2. The tag memory 21 searches for the address of corresponding data in accordance with a pipe instruction that is fed during a corresponding cycle to the control pipeline 10. The tag memory 21 manages the address of corresponding data in each core cache memory (not illustrated) in the core 3, in addition to the address of corresponding data in the data memories 2A.

Although the configuration of the second cache control unit 5B is different from the configuration illustrated in FIG. 2 in that the second cache control unit 5B controls the data memory 2A (M2 or M3), the substantial configuration of the second cache control unit 5B is almost the same as that of the first cache control unit 5A; therefore, redundant description on the configuration and operations will be omitted.

Figure 3:
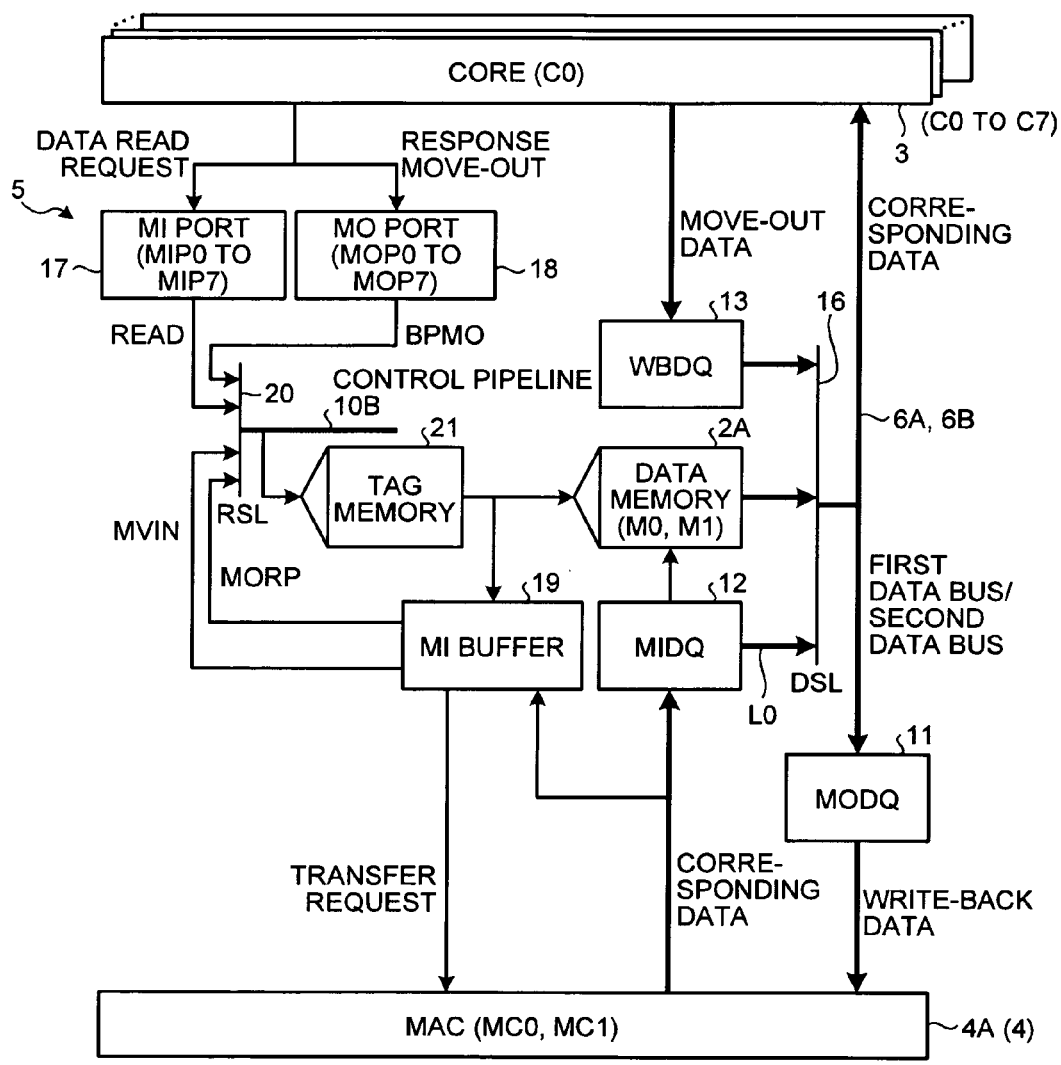
FIG. 3 is an explanatory diagram of an example of a data flow between a core and a first cache control unit and between a MAC and the first cache control unit.

The data flow between the core 3 and the first cache control unit 5A and between the MAC 4 and the first cache control unit 5A will be described below. FIG. 3 is an explanatory view of an example of a data flow between the core 3 and the first cache control unit 5A and between the MAC 4 and the first cache control unit 5A. For example, upon detecting an RD of the core 3 (C0) from the MI port 17, the RSL 20 illustrated in FIG. 3 feeds the RD of the core 3 (C0) during a corresponding cycle (the EVEN cycle or the ODD cycle) to the control pipeline 10. The tag memory 21 searches for the address that corresponds to requested data in the data memory 2A (M0 or M1) in accordance with the RD in the control pipeline 10.

When the address of the data is in the tag memory 21, the tag memory 21 determines that there is a cache hit and then outputs the address of the data to the data memory 2A. In contrast, when the address of the data is not in the tag memory 21, the tag memory 21 determines that there is a cache miss and then outputs a request for transferring the data corresponding to the cache miss to the MI buffer 19.

In addition, when there is a cache hit, the data memory 2A (M0 or M1) reads corresponding data from the data memory 2A in accordance with the address of the data in the tag memory 21 and outputs the data to the DSL 16 via the OSL 15. The DSL 16 outputs the data to the data bus, i.e., the first data bus 6A or the second data bus 6B, that is used for transferring data for the core 3 (C0) that issues the request.

When there is a cache miss, upon detecting the request for transferring the cache-miss corresponding data, the MI buffer 19 notifies the MAC 4A (MC0 or MC1) of the transfer request for transferring the corresponding data to the MIDQ 12. Furthermore, the MI buffer 19 issues an MORP in order to save a free area for registering the data in the data memory 2A.

Upon detecting the MORP, the RSL 20 feeds the MORP during a corresponding cycle to the control pipeline 10. The tag memory 21 searches for the address of the data corresponding to the MORP from the tag memory 21 in accordance with the MORP in the control pipeline 10. When the address of the data corresponding to the MORP is in the tag memory 21, for example, when the address is in the core cache memory, the tag memory 21 notifies the core 3 (C0) of a move-out request.

Upon detecting the move-out request, the core 3 (C0) reads the corresponding move-out data from the core cache memory. After storing the read data as write-back data in the WBDQ 13, the core 3 (C0) notifies the MO port 18, which corresponds to the core 3 (C0), of a response move-out request.

Upon detecting the response move-out request, the MO port 18 issues a BPMO. Upon detecting the BPMO, the RSL 20 feeds the BPMO of the core 3 (C0) during a corresponding cycle to the control pipeline 10. The tag memory 21 deletes the address of the data corresponding to the MORP from the tag memory 21 in accordance with the BPMO in the control pipeline 10 and transfers the write-back data in the WBDQ 13 to the MODQ 11 via the DSL 16 and stores the write-back data in the MODQ 11. Furthermore, the first cache control unit 5A issues, to the MAC 4A (MC0 or MC1), a storage request for storing the write-back data, which is stored in the MODQ 11, in the bank memory (MM0 or MM1) of the main storage device.

Upon detecting the storage request, the MAC 4A (MC0 or MC1) reads the write-back data in the MODQ 11 upon completing preparation for storing the write-back data in the main storage device and then stores the write-back data in the bank memory (MM0 or MM1) in the main storage device. Thereafter the data from the MAC 4 (MC0 or MC1) is stored in the MIDQ 12. Then, upon detecting a registration request for registering the data, which is stored in the MIDQ 12, in the data memory 2A (MM0 or MM1), the MI buffer 19 issues an MVIN. Upon detecting the MVIN, the RSL 20 feeds the MVIN during a corresponding cycle to the control pipeline 10.

The tag memory 21 registers the address of the corresponding data in the tag memory 21 in accordance with the MVIN in the control pipeline 10. Furthermore, while storing the corresponding data, which is stored in the MIDQ 12, in the data memory 2A (M0 or M1), the data memory 2A (M0 or M1) transfers the corresponding data via the connection line L0 to the core 3 (C0).

For example, when the address corresponding to the MORP is not in the core cache memory in the tag memory 21 when an RD is issued but the address is in the data memory 2A (M0 or M1), the data memory 2A (M0 or M1) reads the corresponding data. The data memory 2A (M0 or M1) then transfers the corresponding data to the MODQ 11 via the QSL 14 and the DSL 16 and stores the data in the MODQ 11. Upon storing the corresponding data, the MODQ 11 issues, to the MAC 4A (MC0 or MC1), a request for storing the corresponding data as write-back data in the bank memory (MM0 or MM1) of the main storage device.

Figure 4:
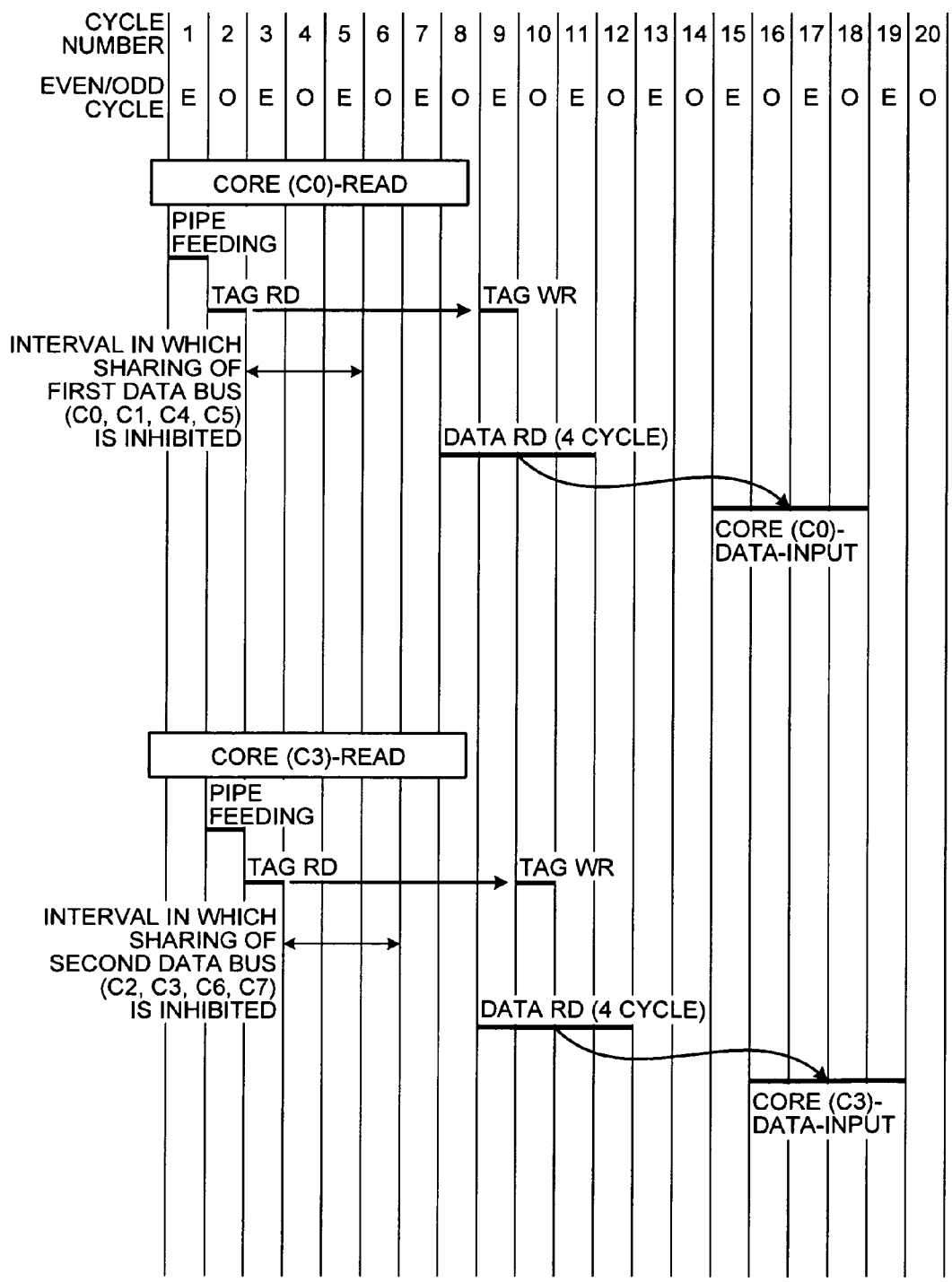
FIG. 4 is an explanatory view illustrating the timing relation in a control pipeline of the first cache control unit.

Operations of the LSI 1 according to the first embodiment will be explained below. FIG. 4 is an explanatory view illustrating the timing relation in the control pipeline 10 of the first cache control unit 5A. FIG. 4 illustrates an example in which, for example, 1st to 20th cycles are divided into EVEN cycles and ODD cycles and the first cache control unit 5A accesses the data memory 2A (M0) during the EVEN cycle and accesses the data memory 2A (M1) during the ODD cycle.

The RSL 20 feeds an RD of the core 3 (C0) during the first cycle (EVEN cycle) to the control pipeline 10. In this case, the tag memory 21 performs a "tag READ" (hereinafter "TAG RD") for reading the address during the 2nd cycle (ODD cycle) and performs a "tag WRITE" (hereinafter "TAG WR") for writing the address during the 9th cycle (EVEN cycle) after the TAG RD. The data memory 2A (M0) reads corresponding data in the period from the 8th cycle (ODD cycle) to the 11th cycle and transfers the corresponding data via the first data bus 6A to the core 3 (C0), which issues the request, in the period from the 15th cycle (the EVEN cycle) to the 18th cycle.

Four cycles are required to transfer data from one cache block in the data bus 6 between the core 3 and the data memory 2A. Thus, the three cycles in the period from the 3rd cycle to the 5th cycle after the TAG RD serve as a bus-sharing inhibition interval in which sharing of the first data bus 6A is inhibited, i.e., feeding of other instructions using the first data bus 6A is inhibited, and also serve as an EVEN-cycle pipe-feeding inhibition interval in which feeding of instructions during the EVEN cycle is inhibited. In other words, when data transfer requires N cycles, the pipe-feeding inhibition interval and the bus-sharing inhibition interval are (N−1) cycles after the feeding of a pipe instruction.

While the TAG RD for the tag memory 21 is performed during the 2nd cycle, i.e., the ODD cycle, TAG WR for the tag memory 21 is performed during the 9th cycle, i.e., the EVEN cycle. Thus, TAG RD and TAG WR are performed in different types of cycles, i.e., in EVEN and ODD cycles. Thus, in the tag memory 21, the access cycles do not compete with each other and accordingly the tag memory 21 can be configured as a single port memory in which an RD access and a WR access are not made simultaneously. While the tag memory 21 can access the control pipeline 10 twice for RD and WD, the data memory 2A can access the control pipeline 10 only once for any one of an RD or WR.

For example, the RSL 20 feeds an RD of the core 3 (C3) during the 2nd cycle (ODD cycle) to the control pipeline 10. In this case, the tag memory 21 performs TAG RD during the 3rd cycle (EVEN cycle) and then performs a TAG WR during the 10th cycle (ODD cycle) after the TAG RD. The data memory 2A (M1) then reads corresponding data in the period from the 9th cycle (EVEN cycle) to the 12th cycle and transfers the corresponding data via the second data bus 6B to the core 3 (C3), which issues the request, in the period from the 16th cycle (ODD cycle) to the 19th cycle. The three cycles in the period from the 4th cycle to the 6th cycle after the TAG RD serve as a bus-sharing inhibition interval in which sharing of the second data bus 6B is inhibited, i.e., feeding other instructions using the second data bus 6B is inhibited, and serves as an ODD-cycle pipe-feeding inhibition interval in which feeding of instructions during the ODD cycle is inhibited.

The data transfer from the data memory 2A to the core 3, which requests data, has been described with reference to FIG. 4. Because four cycles are required even when transferring write-back data from the WBDQ 13 to the MODQ 11 via the data bus 6, the pipe-feeding inhibition interval and the bus-sharing inhibition interval correspond to the three cycles after the feeding of the BPMO.

Figure 5:
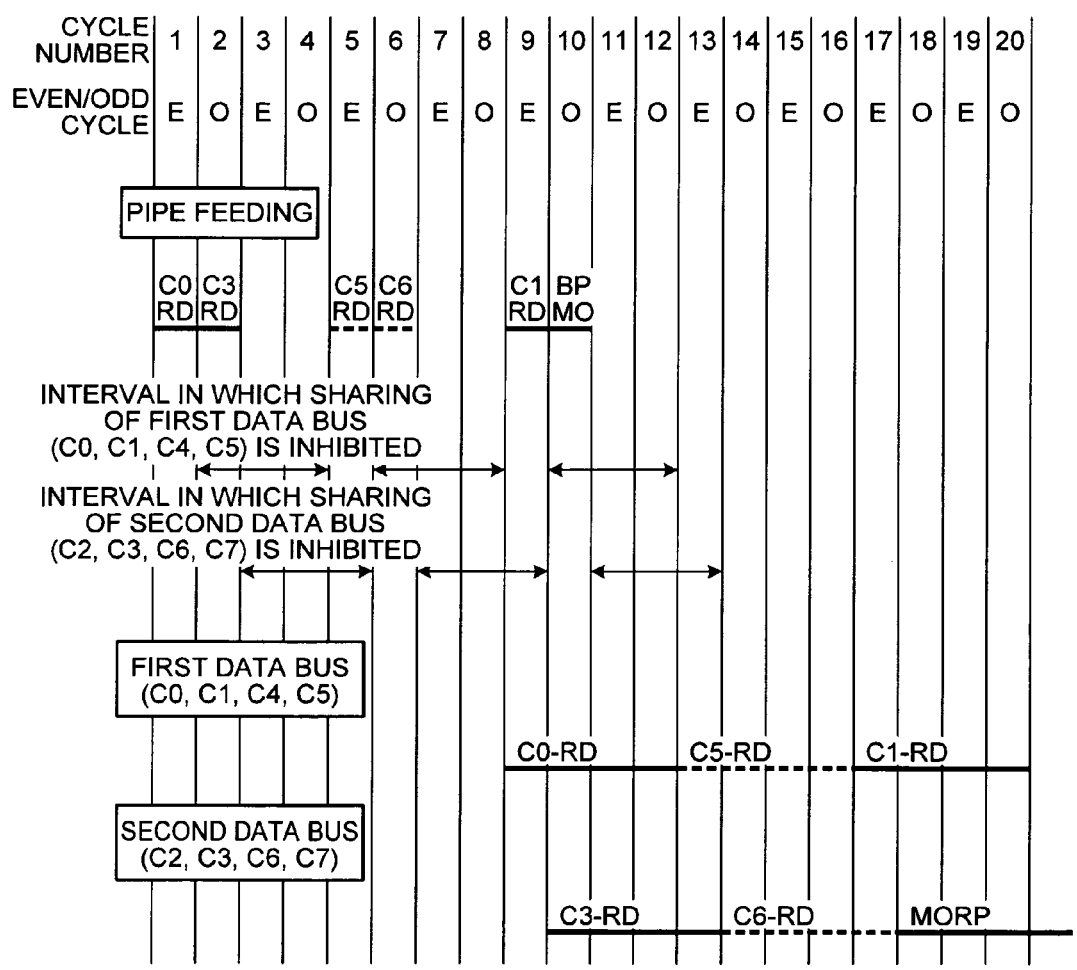
FIG. 5 is an explanatory view illustrating the timing relation in the control pipeline of the first cache control unit according to the first embodiment (a case in which a pipe instruction, for which the same data bus is used, is sequentially fed during the same cycle after a pipe-feeding inhibition interval and a bus-sharing inhibition interval)

Operations will be described that are performed when pipe instructions are sequentially fed during access cycles (EVEN cycle or ODD cycle) to the control pipeline 10. FIG. 5 is an explanatory view illustrating the timing relation in the control pipeline 10 of the first cache control unit 5A according to the first embodiment (a case in which a pipe instruction, for which the same data bus 6 is used, is sequentially fed during the same cycle after a pipe-feeding inhibition interval and a bus-sharing inhibition interval).

The sequential feeding of a pipe instruction means that, after a preceding pipe instruction is fed, a subsequent pipe instruction is fed during the access cycle just after the pipe-feeding inhibition interval and the bus-sharing interval elapse. During the pipe-feeding inhibition interval, feeding of pipe instructions with the same type of cycle as that of the preceding pipe instruction is inhibited, and during the bus-sharing interval, sharing of the same data bus 6 as that used by the preceding pipe instruction is inhibited. Furthermore, the pipe instruction for which the same data bus 6 is used means, in a case where the first data bus 6A is used, pipe instructions for transferring data to the core 3 (C0), the core 3 (C1), the core 3 (C4), the core 3 (C5), or the MODQ-EV 11A. In a case where the second data bus 6B is used, the pipe instructions for which the same data bus 6 is used means, for example, pipe instructions for transferring data to the core 3 (C2), the core 3 (C3), the core 3 (C6), the core 3 (C7), or the MODQ-OD 11B. In the example illustrated in FIG. 5, the 1st to 20th cycles are divided into EVEN cycles and ODD cycles. The first cache control unit 5A accesses the data memory 2A (M0) during the EVEN cycle and accesses the data memory 2A (M1) during the ODD cycle.

For example, upon detecting a data read request from the core 3 (C0) to the data memory 2A (M0), the MI port 17 (MI0) in the first cache control unit 5A issues an RD. The RSL 20 feeds the RD of the core 3 (C0) during the first cycle (EVEN cycle) to the control pipeline 10. The RSL 20 sets the three cycles in the period from the 2nd cycle to the 4th cycle after the feeding of the RD of the core 3 (C0) as an EVEN-cycle pipe-feeding inhibition interval and as an interval in which sharing of the first data bus 6A, which is shared with the core 3 (0) is inhibited.

After the feeding of the RD of the core 3 (C0), the DSL 16 in the first cache control unit 5A starts data transfer in the first data bus 6A during the 9th cycle (EVEN cycle) in order to transfer corresponding data from the data memory 2A (M0) to the core 3 (C0), which issues the request. The first data bus 6A then transfers the corresponding data to the core 3 (C0) in the four cycles in the period from the 9th cycle (EVEN cycle) to the 12th cycle.

For example, upon detecting a data read request from the core 3 (C3) to the data memory 2A (M1), the MI port 17 (M13) issues an RD. The RSL 20 feeds the RD during the 2nd cycle (ODD cycle) to the control pipeline 10. The RSL 20 sets the three cycles in the period from the 3rd cycle to the 5th cycle after the feeding of the RD of the core (C3) as an ODD-cycle pipe-feeding inhibition interval and as an interval in which sharing of the second data bus 6B is inhibited.

After the feeding of the RD of the core 3 (C3), the DSL 16 starts data transfer in the second data bus 6B during the 10th cycle (ODD cycle) in order to transfer corresponding data from the data memory 2A (M1) to the core 3 (C3), which issues the request. The second data bus 6B transfers the corresponding data for the core 3 (C3) in the four cycles in the period from the 10th cycle (ODD cycle) to the 13th cycle.

For example, upon detecting a data read request from the core 3 (C5) to the data memory 2A (M0), the MI port 17 (MI5) issues an RD. The RSL 20 feeds the RD of the core 3 (C5) during the 5th cycle (EVEN cycle) to the control pipeline 10 after the EVEN-cycle pipe-feeding inhibition interval and after the interval in which sharing of the first data bus 6A is inhibited. The RSL 20 sets the three cycles in the period from the 6th cycle to the 8th cycle after the feeding of the RD of the core 3 (C5) as an EVEN-cycle pipe-feeding inhibition interval and as an interval in which sharing of the first data bus 6A is inhibited.

After the feeding of the RD of the core 3 (C5), the DSL 16 starts data transfer in the first data bus 6A during the 13th cycle (EVEN cycle) in order to transfer corresponding data from the data memory 2A (M0) to the core 3 (C5), which issues the request. The first data bus 6A transfers the corresponding data for the core 3 (C5) in the four cycles in the period from the 13th cycle (EVEN cycle) to the 16th cycle.

For example, upon detecting a data read request from the core 3 (C6) to the data memory 2A (M1), the MI port 17 (M16) issues an RD. The RSL 20 feeds the RD of the core 3 (C6) during the 6th cycle (ODD cycle) to the control pipeline 10 after the ODD-cycle pipe-feeding inhibition interval and after the interval in which sharing of the second data bus 6B is inhibited. The RSL 20 sets the three cycles in the period from the 7th cycle to the 9th cycle after the feeding of the RD of the core 3 (C6) as an ODD-cycle pipe-feeding inhibition interval and as an interval in which sharing of the second data bus 6B is inhibited.

After the feeding of the RD of the core 3 (C6), the DSL 16 starts data transfer in the second data bus 6B during the 14th cycle (ODD cycle) in order to transfer corresponding data from the data memory 2A (M1) to the core 3 (C6), which issues the request. The second data bus 6B transfers the corresponding data for the core 3 (C6) in the four cycles in the period from the 14th cycle (ODD cycle) to the 17th cycle.

For example, upon detecting a data read request from the core 3 (C1) to the data memory 2A (M0), the MI port 17 (MI1) issues an RD. The RSL 20 feeds the RD of the core 3 (C1) during the 9th cycle (EVEN cycle) to the control pipeline 10 after the EVEN-cycle pipe-feeding inhibition interval and after the interval in which sharing of the first data bus 6A is inhibited. The RSL 20 sets the three cycles in the period from the 10th cycle to the 12th cycle after the feeding of the RD of the core 3 (C1) as an EVEN-cycle pipe-feeding inhibition interval and as an interval in which sharing of the first data bus 6A is inhibited.

The DSL 16 starts data transfer in the first data bus 6A in order to transfer corresponding data from the data memory 2A (M0) to the core 3 (C1), which issues the request, during the 17th cycle (EVEN cycle) after the feeding of the RD of the core 3 (C1). The first data bus 6A transfers the corresponding data for the core 3 (C1) in the four cycles in the period from the 17th cycle (EVEN cycle) to the 20th cycle.

For example, upon detecting, from the core 3, a move-out request for a move-out from the WBDQ-OD 13B to MODQ-OD 11B, the MO port 18 (MO3) issues a BYPASS MOVE-OUT (hereinafter, "BPMO"). The RSL 20 feeds the BPMO of the core 3 (C3) during the 10th cycle (ODD cycle) to the control pipeline 10, for accessing the WBDQ-OD 13B, after the ODD-cycle pipe-feeding inhibition interval and after the interval in which sharing of the second data bus 6B is inhibited. The RSL 20 sets the three cycles in the period from the 11th cycle to the 13th cycle after the feeding of the BPMO of the core 3 (C3) as an ODD-cycle pipe-feeding inhibition interval and as an interval in which sharing of the second data bus 6B is inhibited.

After the feeding of the BPMO, the DSL 16 starts data transfer in the second data bus 6B during the 18th cycle (ODD cycle) in order to transfer corresponding data from the WBDQ-OD 13B to the MODQ-OD 11B. The second data bus 6B transfers the corresponding data to the MODQ-OD 11B in the four cycles in the period from the 18th cycle (ODD cycle) to the 21st cycle.

Accordingly, in the first data bus 6A, when pipe instructions are fed sequentially during an EVEN cycle every four cycles, corresponding data for the core 3 (C0), the core 3 (C5), and the core 3 (C1) can be sequentially transferred from the data memory 2A (M0) without intermittency. In the second data bus 6B, when pipe instructions are fed sequentially during an ODD cycle every four cycles, corresponding data for the core 3 (C3), the core 3 (C6), and the MODQ-OD 11B can be sequentially transferred from the data memory 2A (M1) and the WBDQ-OD 13B without intermittency.

As described above, in the first embodiment, the main storage device, which is shared by the multiple cores 3, is divided into multiple bank memories and the cache memory 2 is divided into the multiple data memories 2A in accordance with the bank memories. This significantly increases the efficiency with which the cores 3 access the data memories 2A and significantly increases the ratio with which the cores 3 acquire data from the data memories 2A.

Furthermore, in the first embodiment, accesses to the multiple data memories 2A (M0 and M1: M2 and M3) are controlled using the shared single control pipeline 10 and the cycles in the control pipeline 10 are divided into the two types of access cycles for the data memories 2A (M0 and M1: M2 and M3). As a result, the separate control pipeline 10 for each data memory 2A is not required and thus the number of components can be reduced and control can be simplified.

Furthermore, in the first embodiment, the cache control unit 5 is divided into the first cache control unit 5A and the second cache control unit 5B and control of the data memories 2A is shared by the first cache control unit 5A and the second cache control unit 5B. Specifically, the first cache control unit 5A controls the data memories 2A (M0 and M1) and the second cache control unit 5B controls the data memories 2A (M2 and M3). By distributing the burden of control to the first cache control unit 5A and second cache control units 5B, the process efficiency can be improved.

In the first embodiment, when subsequent pipe instructions, for which the same data bus 6 as that used for the preceding pipe instruction is used, are sequentially fed during the same type of cycle as that during which the preceding pipe instruction is fed after the pipe-feeding inhibition interval and after the bus-sharing inhibition interval, the data corresponding to the pipe instructions can be sequentially transferred in the data bus 6 without intermittency. Accordingly, stable data transfer efficiency can be ensured in the data bus 6 without requiring a complicated bus structure. For example, when subsequent pipe instructions, for which the first data bus 6A is used, are sequentially fed during the same type of cycle, by sequentially transferring the data corresponding to the pipe instructions without intermittency, stable data transfer efficiency can be ensured in the first data bus 6A. Similarly, when subsequent pipe instructions, for which the second data bus 6B is used, are sequentially fed during the same cycle, by sequentially transferring the data corresponding to the pipe instructions without intermittency, stable data transfer efficiency can be ensured in the second data bus 6B.

Figure 6:
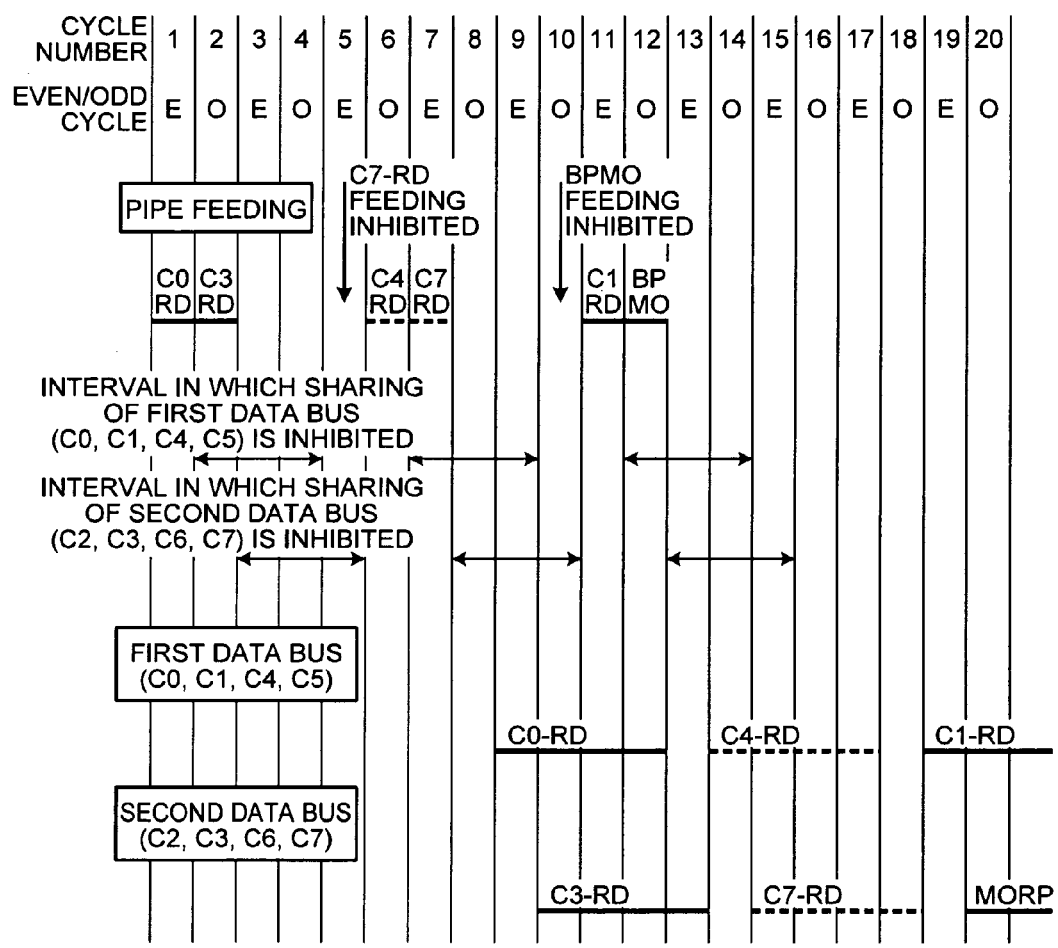
FIG. 6 is an explanatory view illustrating the timing relation in the control pipeline of the first cache control unit (a case in which a pipe instruction, for which the same data bus is used, is sequentially fed during a different cycle after a pipe-feeding inhibition interval and a bus-sharing inhibition interval)

When subsequent pipe instructions, for which the data bus 6 that is used for the preceding pipe instructions is used, are sequentially fed during the same type of cycle after the pipe-feeding inhibition interval and after the bus-sharing inhibition interval for the preceding pipe instruction, the data corresponding to the pipe instructions can be sequentially transferred. Operations will be explained below that are performed in a case where, after the pipe-feeding inhibition interval and after the bus-sharing inhibition interval for the preceding pipe instruction, subsequent pipe instructions, for which the same data bus 6 as that used for the preceding pipe instruction is used, are sequentially fed during different cycles. FIG. 6 is an explanatory view illustrating the timing relation in the control pipeline 10 of the first cache control unit 5A (a case in which a pipe instruction, for which the same data bus 6 is used, is sequentially fed during a different cycle after a pipe-feeding inhibition interval and a bus-sharing inhibition interval). FIG. 6 illustrates an example in which, for example, the 1st to 20th cycles are divided into EVEN cycles and ODD cycles. The first cache control unit 5A accesses the data memory 2A (M0) during the EVEN cycle and accesses the data memory 2A (M1) during the ODD cycle.

For example, upon detecting a data read request from the core 3 (C0) to the data memory 2A (M0), the MI port 17 (MI0) issues an RD. The RSL 20 feeds the RD of the core 3 (C0) during the 1st cycle (EVEN cycle) to the control pipeline 10. The RSL 20 sets the three cycles in the period from the 2nd cycle to the 4th cycle after the feeding of the RD of the core 3 (C0) as an EVEN-cycle pipe-feeding inhibition interval and as an interval in which sharing of the first data bus 6A is inhibited.

After the feeding of the RD of the core 3 (C0), the DSL 16 starts data transfer in the first data bus 6A during the 9th cycle (EVEN cycle) in order to transfer corresponding data from the data memory 2A (M0) to the core 3 (C0), which issues the request. The first data bus 6A transfers the corresponding data for the core 3 (C0) in the four cycles in the period from the 9th cycle (EVEN cycle) to the 12th cycle.

For example, upon detecting a data read request from the core 3 (C3) to the data memory 2A (M1), the MI port 17 (MI3) issues an RD. The RSL 20 feeds the RD of the core (C3) during the 2nd cycle (ODD cycle) to the control pipeline 10. The RSL 20 sets the three cycles in the period from the 3rd cycle to the 5th cycle after the feeding of the RD of the core 3 (C3) as an ODD-cycle pipe-feeding inhibition interval and as a bus-sharing inhibition interval in which sharing of the second data bus 6B is inhibited.

After the feeding of the RD of the core 3 (C3), the DSL 16 starts data transfer in the second data bus 6B during the 10th cycle (ODD cycle) in order to transfer corresponding data from the data memory 2A (M1) to the core 3 (C3), which issues the request. The second data bus 6B transfers the corresponding data for the core 3 (C3) in the four cycles in the period from the 10th cycle (ODD cycle) to the 13th cycle.

For example, upon detecting a data read request from the core 3 (C7) to the data memory 2A (M0), the MI port 17 (MI7) issues an RD. The RSL 20 is supposed to feed the RD of the core 3 (C7) during the 5th cycle (EVEN cycle) to the control pipeline 10 after the EVEN-cycle pipe-feeding inhibition interval and after the interval in which sharing of the first data bus 6A is inhibited. However, the 5th cycle (EVEN cycle) is within the interval in which sharing of the second data bus 6B is inhibited (3rd to 5th cycles); therefore, the preceding data for the core 3 (C3) and the subsequent data for the core 3 (C7) in the second data bus 6B interfere with each other during the 12th cycle. For this reason, the RSL 20 inhibits feeding of the RD of the core (C7) during the fifth cycle (EVEN cycle) in accordance with the interval in which sharing of the second data bus 6B is inhibited (3rd to 5th cycles) and waits until the next cycle (EVEN cycle) to feed the RD.

For example, upon detecting a data read request from the core 3 (C4) to the data memory 2A (M1), the MI port 17 (MI4) issues an RD. The RSL 20 feeds the RD of the core (C4) during the 6th cycle (ODD cycle) to the control pipeline 10 after the ODD-cycle pipe-feeding inhibition interval and after the interval in which sharing of the first data bus 6A is inhibited. The RSL 20 sets the three cycles in the period from the 7th cycle to the 9th cycle after the feeding of the RD of the core 3 (C4) as an ODD-cycle pipe-feeding inhibition interval and as an interval in which sharing of the first data bus 6A is inhibited.

After the feeding of the RD of the core 3 (C4), the DSL 16 starts data transfer in the first data bus 6A during the 14th cycle (ODD cycle) in order to transfer corresponding data from the data memory 2A (M1) to the core 3 (C4), which issues the request. The first data bus 6A transfers the corresponding data for the core 3 (C4) in the four cycles in the period from the 14th cycle (ODD cycle) to the 17th cycle. Because the pipe instruction for which the same first data bus 6A is used is sequentially fed during the ODD cycle that is different from that during which the preceding pipe instruction is fed, one cycle of intermittency occurs during the 13th cycle between the preceding data for the core 3 (C0) and the subsequent data.

After the EVEN-cycle pipe-feeding inhibition interval and after the interval in which sharing of the second data bus 6B is inhibited, the RSL 20 feeds the waiting RD of the core 3 (C7) during the 7th cycle to the control pipeline 10. The RSL 20 sets the three cycles in the period from the 8th cycle to the 10th cycle after the feeding of the RD of the core 3 (C7) as an EVEN-cycle pipe-feeding inhibition interval and as an interval in which sharing of the second data bus 6B ds inhibited.

The request is detected during the EVEN cycle, which is different from that during which the preceding pipe instruction is detected, using the second data bus 6B, which is the same as that used for the preceding pipe instruction; therefore, feeding the RD is delayed by one cycle. After the feeding of the RD of the core 3 (C7), the DSL 16 starts data transfer in the second data bus 6B during the 15th cycle (EVEN cycle) in order to transfer corresponding data from the data memory 2A (M0) to the core 3 (C7), which issues the request. The second data bus 6B transfers the corresponding data for the core 3 (C7) in the four cycles in the period from the 15th cycle (EVEN cycle) to the 18th cycle. Because the pipe instruction for which the same second data bus 6B is used is sequentially fed during the EVEN cycle that is different from that during which the preceding pipe instruction is fed, one cycle of intermittency occurs during the 14th cycle between the data for the core 3 (C3) and the data for the core 3 (C7) in the second data bus 6B.

For example, upon detecting, from the core 3 (C3), a request for move-out from the WBDQ-OD 13B to the MIDQ-OD 11B, the MO port 18 (MO3) issues a BPMO. The RSL 20 is supposed to feed the BPMO of the core 3 (C3) during the 10th cycle (ODD cycle) to the control pipeline 10 after the ODD-cycle pipe-feeding inhibition interval. However, the 10th cycle (ODD cycle) is within the interval in which sharing of the second data bus 6B is inhibited (8th to 10th cycles); therefore, the data for the core 3 (C7) and the data for the MODQ-OD 11B in the second data bus 6B interfere with each other during the 18th cycle. For this reason, the RSL 20 inhibits feeding of the BPMO from the core (C3) during the 10th cycle (ODD cycle) in accordance with the interval in which sharing of the second data bus 6B is inhibited (8th to 10th cycles) and waits until the next cycle (ODD cycle) to feed the BPMO.

For example, upon detecting a data read request from the core 3 (C1) to the data memory 2A (M0), the MI port 17 (MI1) issues an RD. The RSL 20 feeds the RD of the core 3 (C1) during the 11th cycle (EVEN cycle) to the control pipeline 10 after the EVEN-cycle pipe-feeding inhibition interval and after the interval in which sharing of the first data bus 6A is inhibited. The RSL 20 sets the three cycles in the period from the 12th cycle to the 14th cycle after the feeding of the RD of the core 3 (C1) as an EVEN-cycle pipe-feeding inhibition interval and as an interval in which sharing of the first data bus 6A is inhibited.

After the feeding of the RD of the core 3 (C1), the DSL 16 starts data transfer in the first data bus 6A during the 19th cycle (EVEN cycle) in order to transfer corresponding data from the data memory 2A (M0) to the core 3 (C1) that issues the request. The first data bus 6A transfers the corresponding data for the core 3 (C1) in the four cycles in the period from the 19th cycle (EVEN cycle) to the 22nd cycle. Because the pipe instruction for which the same first data bus 6A is used is sequentially fed during the EVEN cycle that is different from that during which the preceding pipe instruction is fed, one cycle of intermittence occurs during the 18th cycle between the data for the core 3 (C4) and the data for the core 3 (C1) in the first data bus 6A.

After the ODD-cycle pipe-feeding inhibition interval and after the interval in which sharing of the second data bus 6B is inhibited, the RSL 20 feeds the BPMO of the core 3 (C3) during the 12th cycle to the control pipeline 10. The RSL 20 sets the three cycles in the period from the 13th cycle to the 15th cycle after the feeding of the BPMO of the core 3 (C3) as an ODD-cycle pipe-feeding inhibition interval and as an interval in which sharing of the second data bus 6B is inhibited.

The request is detected during the ODD cycle, which is different from that during which the preceding pipe instruction is detected, using the second data bus 6B, which is the same as that used for the preceding pipe instruction; therefore, feeding the RD is delayed by one cycle. After the feeding of the BPMO of the core 3 (C3), the DSL 16 starts data transfer in the second data bus 6B during the 20th cycle (ODD cycle) in order to transfer corresponding data from the WBDQ-OD 13B to the MODQ-OD 11B that issues the request. The second data bus 6B transfers the corresponding data to a MODQ-OD 18B in the four cycles in the period from the 20th cycle (ODD cycle) to the 23rd cycle. Because the pipe instruction for which the same second data bus 6B is used is sequentially fed during the ODD cycle that is different from that during which the preceding pipe instruction is fed, one cycle of intermittency occurs during the 19th cycle between the data for the core 3 (C7) and the data for the MODQ-OD 11B in the second data bus 6B.

When a subsequent pipe instruction, for which the data bus 6 that is the same as that used for the preceding pipe instruction is used, is sequentially fed during a cycle different from that during which the preceding pipe instruction is fed, one cycle of intermittency occurs between the data for the preceding pipe instruction and the data for the subsequent pipe instruction in the same data bus 6. Accordingly, data transfer efficiency in the data bus 6 decreases. In order to deal with such a situation, an LSI that ensures stable data transfer efficiency in the data bus 6 will be described below as a second embodiment of the present invention.

Figure 7:
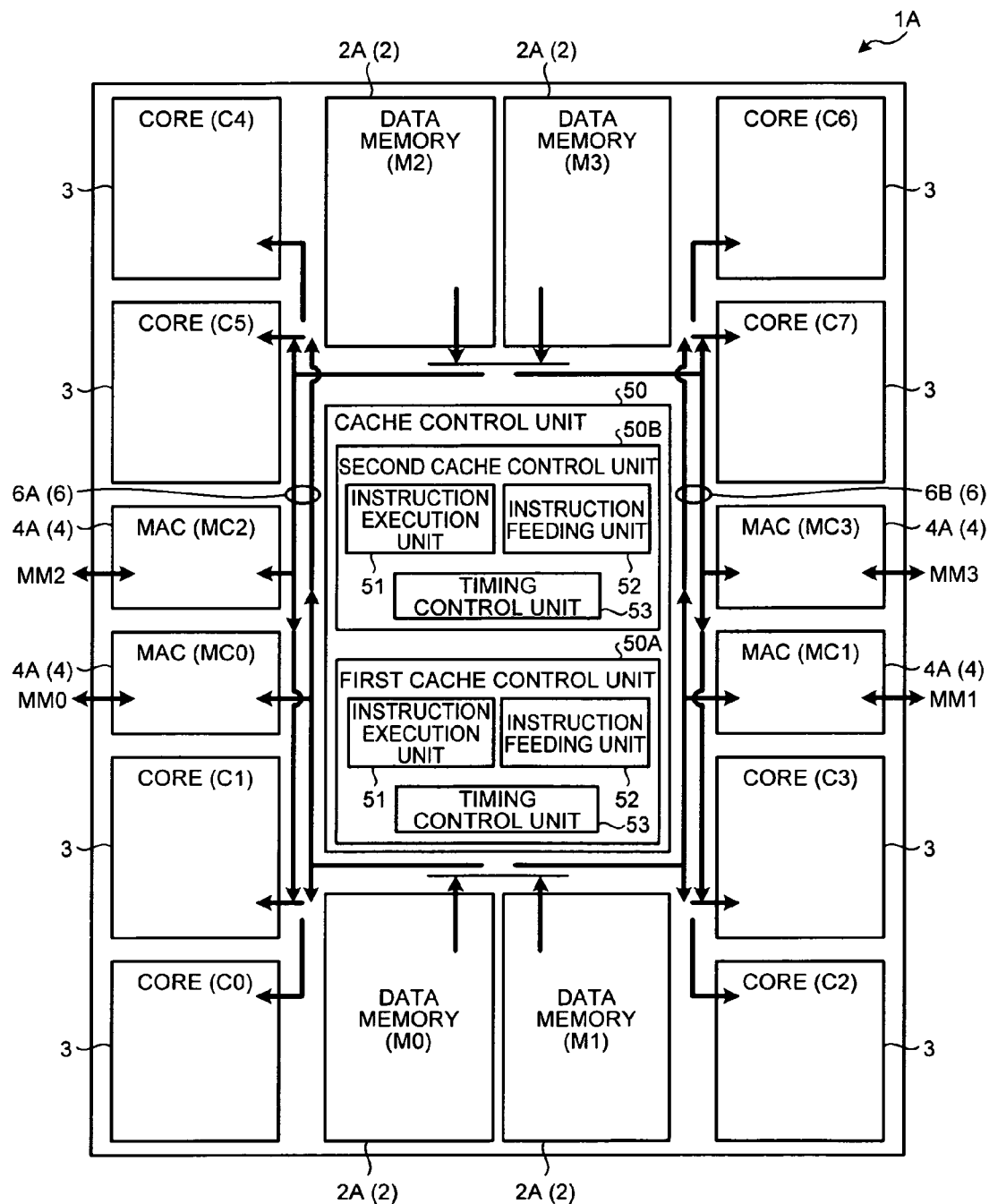
FIG. 7 is a block diagram of a configuration of an LSI according to a second embodiment of the present invention.

FIG. 7 is a block diagram of a configuration of an LSI according to the second embodiment. The same components as those of the first embodiment are denoted by the same reference numerals as those of the first embodiments and detailed description for them will be omitted below. An LSI 1A illustrated in FIG. 7 includes the cache memory 2, the core 3, the memory access controller (MAC) 4, a cache control unit 50, and the data bus 6. The cache memory 2 is connected to the core 3, the MAC 4, the cache control unit 50, and the data bus 6. The cache memory 2 temporarily stores data that is stored in a main storage device (not illustrated) and used for arithmetic processing that is performed by the core 3.

If the main storage device is divided into, for example, four bank memories (MM0 to MM3), the cache memory 2 is divided into four data memories 2A (M0 to M3) in association with the bank memories (MM0 to MM3). The cache memory 2 is, for example, a RAM. The core 3 is connected to, for example, the data bus 6 and the cache control unit 50 and performs various arithmetic processes in accordance with the data in the cache memory 2. The core 3 includes, for example, eight cores 3 (C0 to C7).

The MAC 4 is connected to the cache control unit 50 and controls the bank memories (MM0 to MM3). The MAC 4 is divided into four MACs 4A (MC0 to MC3) in association with the bank memories (MM0 to MM3). For example, MC0 of the MAC 4 controls the bank memory (MM0) that is associated with the data memory 2A (M0), and MC3 of the MAC 4 controls the bank memory (MM3) that is associated with the data memory 2A (M3).

The cache control unit 50 is connected to the core 3, the MAC 4, the data bus 6, and the main storage device. The cache control unit 50 controls data transfer between the core 3, the MAC 4, the data bus 6, and the main storage device. On the LSI 1A, for example, the eight cores 3 (C0 to C7), the four data memories 2A (M0 to M3), and the four MACs 4A (MC0 to MC3) are arranged on the outer edge of the board and the cache control unit 50 is arranged at the center of the board.

The cache control unit 50 includes a first cache control unit 50A and a second cache control unit 50B. The first cache control unit 50A controls the data memories 2A (M0 and M1) and the MACs 4A (MC0 and MC1). The second cache control unit 50B controls the data memories 2A (M2 and M3) and the MACs 4A (MC2 and MC3).

The data bus 6 transfers data between the multiple cores 3 and the multiple data memories 2A. For example, the LSI 1A includes the first data bus 6A and the second data bus 6B. The first data bus 6A transfers data, for example, from the data memories 2A to the multiple cores 3 (C0, C1, C4, and C5). The second data bus 6B transfers data, for example, from the data memories 2A to the multiple cores 3 (C2, C3, C6, and C7).

The first cache control unit 50A includes an instruction execution unit 51, an instruction feeding unit 52, and a timing control unit 53. The instruction execution unit 51 accesses each data memory 2A in accordance with each access cycle for each data memory 2A and executes an instruction, for accessing the data memory 2A, from the core 3 that issues the request. When accessing the data memory 2A (M0), the instruction execution unit 51 executes the access instruction during the EVEN cycle. When accessing the data memory 2A (M1), the instruction execution unit 51 executes the access instruction during the ODD cycle. Upon executing the instruction, from the core 3 that issues the request, for accessing the data memory 2A, the instruction execution unit 51 transfers the data that is read from the data memory 2A to the data bus 6 corresponding to the core 3, which issues a request.

The instruction feeding unit 52 receives, from the core 3 that issues a request, an instruction for accessing the data memory 2A and feeds the access instruction to the instruction execution unit 51. The instruction feeding unit 52 receives an access instruction from the core 3, which issues a request, and also inhibits feeding of a subsequent instruction for accessing the same data memory 2A in the period that is required to execute the preceding access instruction. The period required to execute the preceding access instruction corresponds to, for example, a period that is required to execute an access instructions for reading data, writing data, or transfer data.

The instruction feeding unit 52 also inhibits feeding of a subsequent access instruction, for which the same data bus 6 as that is used for the preceding access instruction is used, in a predetermined period shorter than that required to execute the preceding access instruction. The subsequent access instruction, for which the same data bus 6 as that used for the preceding access instruction is used, corresponds to, for example, a subsequent access instruction, for which the same data bus as that used for transferring data that is read according to the preceding access instruction is used.

When a subsequent access instruction for which the same data bus 6 is used is fed in the period that is required to execute the preceding access instruction, the timing control unit 53 controls the timing at which transfer of the subsequent data corresponding to the subsequent access instruction, in the first data bus 6A is started. The timing control unit 53 further controls the instruction execution unit 51 to delay the timing at which transfer of the subsequent data, which is read from the data memory 2A in accordance with the subsequent access instruction, is transferred to the data bus 6 is started. The timing at which the transfer of the subsequent data to the data bus 6 is started corresponds to, for example, the timing at which the subsequent data is fed to the data bus 6.

Just after transfer of the data corresponding to the preceding access instruction to the data bus 6 is completed, the timing control unit 53 controls the instruction execution unit 51 to delay the timing at which transfer of the subsequent data is started and start operations for transferring the subsequent data in the same data bus 6. Accordingly, the preceding data and the subsequent data can be transferred sequentially in the same data bus 6.

In the second embodiment, when a subsequent access instruction for which the same data bus 6 is used is fed in a period that is required to execute a preceding access instruction, the timing is delayed at which transfer of the data to the data bus 6 is started, which is the data read from the data memory 2A in accordance with the subsequent access instruction. Thus, in the same data bus 6, the preceding data and the subsequent data can be sequentially transferred without causing data interference and data intermittency between the preceding data and the subsequent data.

Furthermore, in the second embodiment, stable data transfer efficiency can be ensured in the data bus 6 between the multiple data memories 2A and the multiple cores 3.

Figure 8:
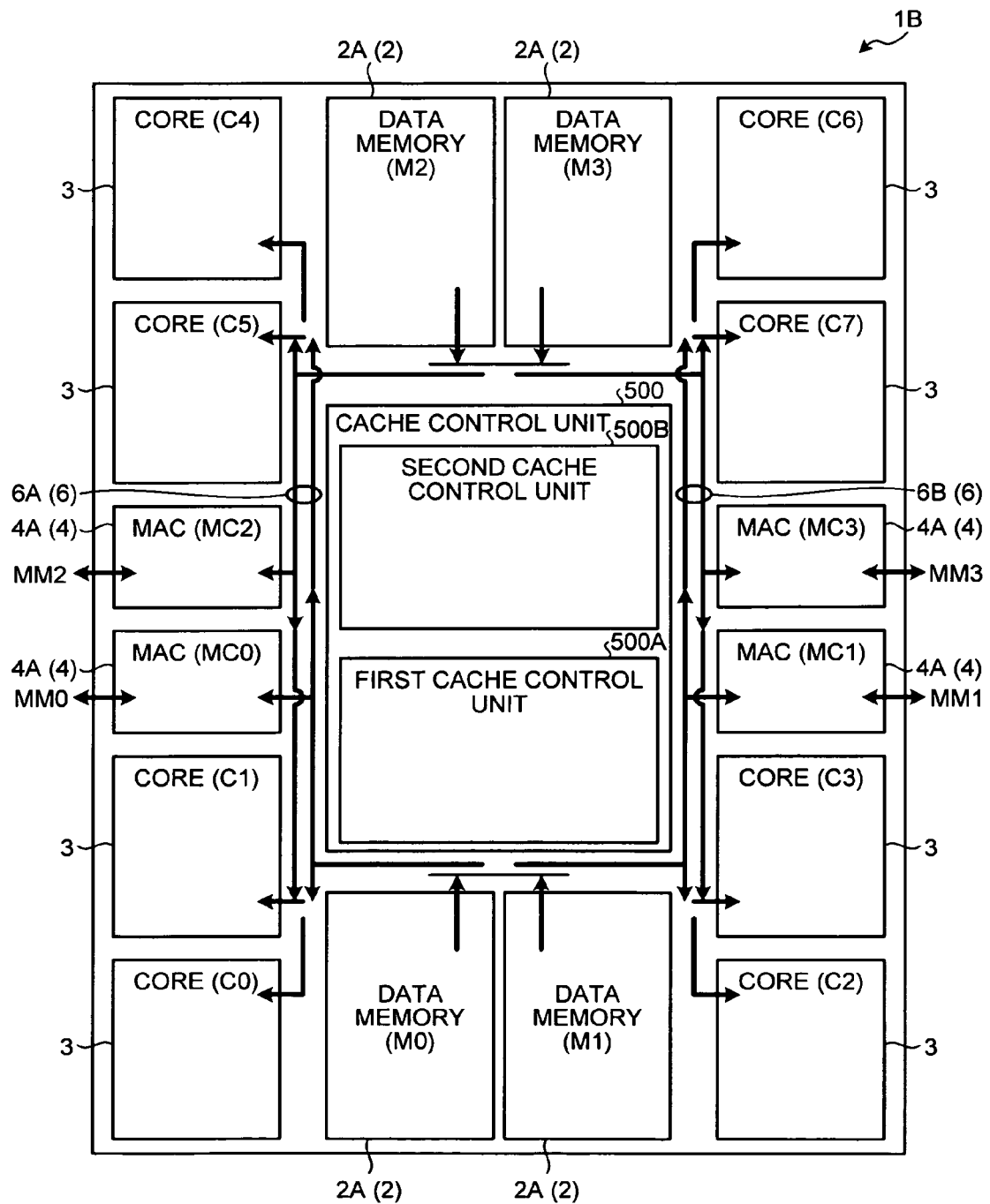
FIG. 8 is a block diagram of a configuration of an LSI according to a third embodiment of the present invention.

An LSI according to a third embodiment of the present invention will be described in detail below with reference to the accompanying drawings. FIG. 8 is a block diagram of a configuration of the LSI according to the third embodiment. An LSI 1B illustrated in FIG. 8 includes the cache memory 2, the core 3, the memory access controller (MAC) 4, a cache control unit 500, and the data bus 6. The cache memory 2 is connected to the core 3, the MAC 4, the cache control unit 500, and the data bus 6. The cache memory 2 temporarily stores data that is stored in a main storage device (not illustrated) and used for arithmetic processing that is performed by the core 3.

If the main storage device is divided into, for example, four bank memories (MM0 to MM3), the cache memory 2 is divided into four data memories 2A (M0 to M3) in association with the bank memories (MM0 to MM3). The cache memory 2 is, for example, a random access memory (hereinafter, "RAM"). The core 3 is connected to, for example, the data bus 6 and the cache control unit 500. The core 3 performs various arithmetic processes in accordance with the data in the cache memory 2. The core 3 includes, for example, eight cores 3 (C0 to C7).

The MAC 4 is connected to the cache control unit 500 and controls the bank memories (MM0 to MM3). The MAC 4 is divided into four MACs 4A (MC0 to MC3) in association with the bank memories (MM0 to MM3). For example, MC0 of the MAC 4 controls the bank memory (MM0) that is associated with the data memory 2A (M0), and MC3 of the MAC 4 controls the bank memory (MM3) that is associated with the data memory 2A (M3).

The cache control unit 500 is connected to the core 3, the MAC 4, the data bus 6, and the main storage device. The cache control unit 500 controls data transfer between the core 3, the MAC 4, the data bus 6, and the main storage device. On the LSI 1B, for example, the eight cores 3 (C0 to C7), the four data memories 2A (M0 to M3), and the four MACs 4A (MC0 to MC3) are arranged on the outer edge of the board and the cache control unit 500 is arranged at the center of the board.

The cache control unit 500 includes a first cache control unit 500A and a second cache control unit 500B. The first cache control unit 500A controls the data memories 2A (M0 and M1) and the MACs 4A (MC0 and MC1). The second cache control unit 500B controls the data memories 2A (M2 and M3) and the MACs 4A (MC2 and MC3).

The data bus 6 transfers data between the multiple cores 3 and the multiple data memories 2A. For example, the LSI 1B includes the first data bus 6A and the second data bus 6B. The first data bus 6A transfers data, for example, from the data memories 2A to the multiple cores 3 (C0, C1, C4, and C5). The second data bus 6B transfers data, for example, from the data memories 2A to the multiple cores 3 (C2, C3, C6, and C7).

Figure 9:
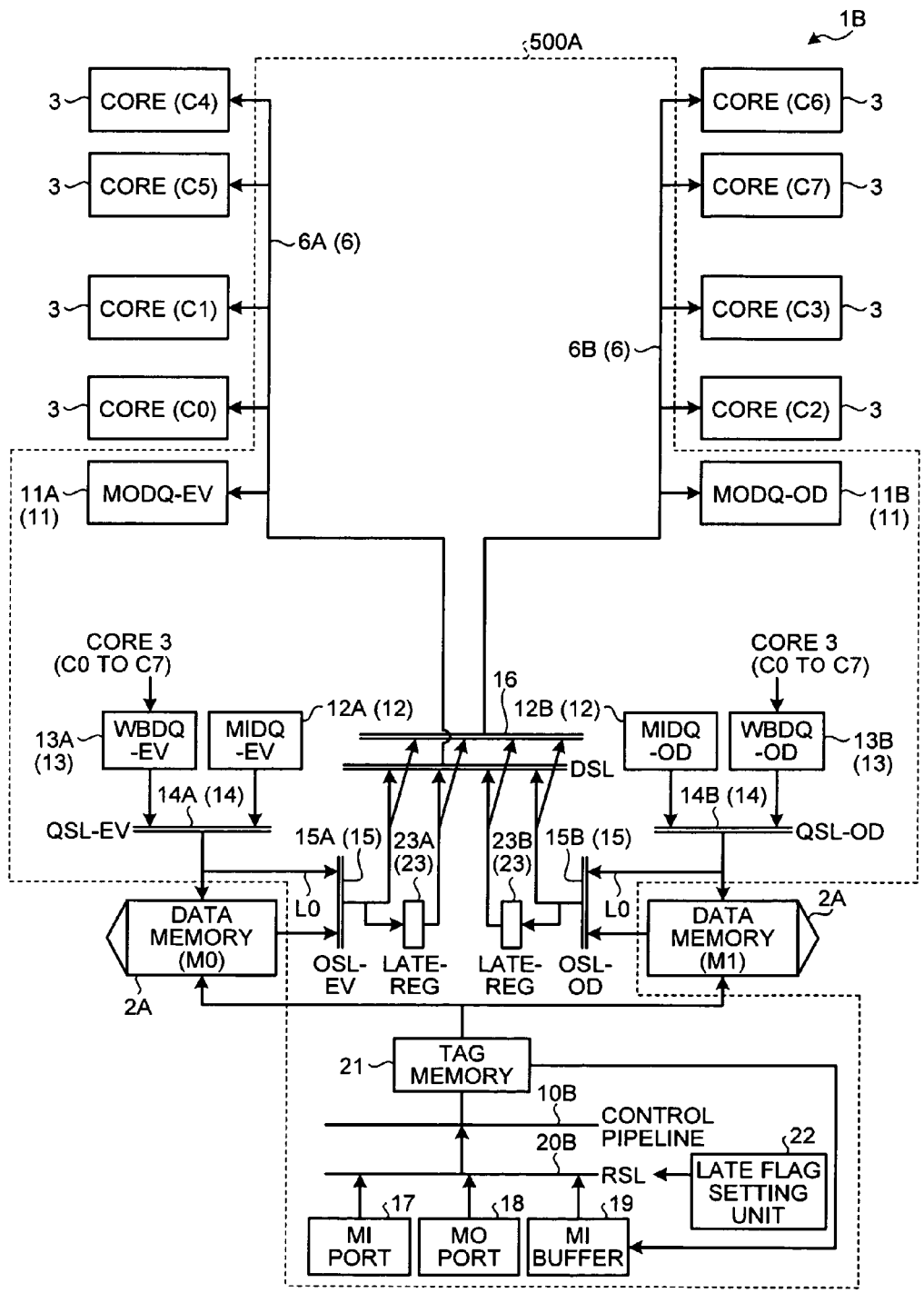
FIG. 9 is a block diagram of a configuration of a first cache control unit according to the third embodiment.

A configuration of the first cache control unit 500A will be described below. FIG. 9 is a block diagram of a configuration of the first cache control unit 500A according to the third embodiment. The first cache control unit 500A includes a control pipeline 10B, the move-out data queue (MODQ) 11, and the move-in data queue (MIDQ) 12. The first cache control unit 500A further includes the write-back data queue (WBDQ) 13, the queue selector (QSL) 14, and the connection line L0. The first cache control unit 500A further includes the output selector (OSL) 15 and the data selector (DSL) 16. The first cache control unit 500A further includes the move-in port (MI port) 17, the move-out port (MO port) 18, and the move-in buffer (MI buffer) 19. The first cache control unit 500A further includes a request selector (RSL) 20B, the tag memory 21, a late flag setting unit 22, and a late register (hereinafter "LATE-REG") 23.

The control pipeline 10B receives fed pipe instructions, with respect to the data memories 2A (M0 and M1), during two types of cycles, i.e., EVEN cycles and ODD cycles. The EVEN cycle is used when accessing the data memory 2A (M0) and the ODD cycle is used when accessing the data memory 2A (M1).

The MODQ 11 is connected to the data bus 6 and the MAC 4 and stores move-out data. The MODQ 11 includes the EVEN-cycle MODQ-EV 11A and the ODD-cycle MODQ-OD 11B. The MODQ-EV 11A is connected to the first data bus 6A and the MODQ-OD 11B is connected to the second data bus 6B. Move-out data is data that is deleted from the cache memory 2.

The MIDQ 12 is connected to the QSL 14 and the MAC 4. The MIDQ 12 stores move-in data. The MIDQ 12 includes the EVEN-cycle MIDQ-EV 12A and the ODD-cycle MIDQ-OD 12B. The MIDQ-EV 12A and the MIDQ-OD 12B are connected to the MACs 4A (MC0 and MC1). Move-in data is data that is newly registered in the cache memory 2.

The WBDQ 13 is connected to the core 3 and the QSL 14 and stores write-back data. The WBDQ 13 includes the EVEN-cycle WBDQ-EV 13A and the ODD-cycle WBDQ-OD 13B. Write-back data is data that is already registered in the cache memory (not illustrated) in the core 3 and is to be returned to the cache memory 2 or the main storage device.

The QSL 14 is connected to the data memories 2A, the WBDQ 13, the MIDQ 12, and the connection line L0. The QSL 14 outputs output data from the WBDQ 13 or output data from the MIDQ 12 to the data memories 2A and the connection line L0. The QSL 14 includes the EVEN-cycle QSL-EV 14A and the ODD-cycle QSL-OD 14B. The QSL-EV 14A outputs output data from the WBDQ-EV 13A or output data from the MIDQ-EV 12A to the data memory 2A (M0) and the connection line L0. The QSL-OD 14B outputs output data from the WBDQ-OD 13B or output data from the MIDQ-OD 12B to the data memory 2A (M1) and the connection line L0.

The connection line L0 is connected to the QSL 14 and the QSL 15. The connection line L0 serves as, for example, a transmission line that directly connects the QSL-EV 14A and the OSL-EV 15A or directly connects the QSL-OD 14B and the OSL-OD 15B. The connection line L0 directly outputs corresponding data, for example, from the QSL-EV 14A to the OSL-EV 15A. The connection line L0 directly outputs corresponding data, for example, from the QSL-OD 14B to the OSL-OD 15B.

The OSL 15 is connected to the data memory 2A (M0), the connection line L0, the DSL 16, and the LATE-REG 23. The OSL 15 outputs the output data from the data memory 2A or output data from the QSL 14, which is output via the connection line L0, to the DSL 16. The OSL 15 includes the EVEN-cycle OSL-EV 15A and the ODD-cycle OSL-OD 15B. The OSL-EV 15A outputs output data from the data memory 2A (M0) to the DSL 16 or the LATE-REG 23A. The OSL-EV 15A further outputs output data from the QSL-EV 14A, which is output via the connection line L0, to the DSL 16 or the LATE-REG 23A. The OSL-OD 15B outputs output data from the data memory 2A (M1) to the DSL 16 or the LATE-REG 23B. The OSL-OD 15B further outputs output data from the QSL-OD 14B, which is output via the connection line L0, to the DSL 16 or the LATE-REG 23B.

The first data bus 6A is connected to the cores 3 (C0, C1, C4, C5) and the MODQ-EV 11A. The second data bus 6B is connected to the cores 3 (C2, C3, C6, C7) and the MODQ-OD 11B. The DSL 16 is connected to the OSL 15 and the LATE-REG 23 and outputs output data from the OSL-EV 15A, the OSL-OD 15B, the LATE-REG 23A, or the LATE-REG 23B to the data bus 6 (the first data bus 6A or the second data bus 6B).

The MI port 17 is connected to the cores 3 and the RSL 20B. Upon detecting a move-in request from the core 3, the MI port 17 issues a READ (RD). The MI port 17 is provided with respect to each core 3 (C0 to C7). The MI port 17 includes eight MI ports (MIP0 to MIP7). An RD is a pipe instruction that corresponds to a data read request from the core 3.

The MO port 18 is connected to the cores 3 and the RSL 20B. Upon detecting a move-out request from the core 3, the MO port 18 issues a BPMO. The MO port 18 is provided with respect to each core 3 (C0 to C7). The MO port 18 includes eight MO ports 18 (MOP0 to MOP7). A BPMO is a pipe instruction for storing write-back data, which is stored in the WBDQ 13, in the MODQ 11.

The MI buffer 19 is connected to the MACs 4 and the RSL 20B. The MI buffer 19 outputs a request to the MAC 4 and issues a pipe instruction in response to a request from the MAC 4. The MI buffer 19 is arranged for each MAC 4 (MC0 and MC1). The pipe instruction from the MI buffer 19 is a MOVE-OUT REPLACE (MORP) for requesting deletion of corresponding data from the cache memory 2 or a MOVE-IN (MVIN) for requesting registration of corresponding data in the cache memory 2.

The RSL 20B is connected to the MI port 17, the MO port 18, the MI buffer 19, and the control pipeline 10B. The RSL 20 feeds a pipe instruction during a corresponding cycle (the EVEN cycle or the ODD cycle) to the control pipeline 10B. When the RSL 20B feeds a pipe instruction of the core 3 during the EVEN cycle or the ODD cycle to the control pipeline 10B, the RSL 20B sets the three cycles after the pipe feeding during the cycle as a pipe-feeding inhibition interval in which feeding of instruction during the same cycle is inhibited. The pipe-feeding inhibition interval corresponds to the period that is required to execute the preceding pipe instruction, i.e., corresponds to the three cycles after the pipe feeding. The pipe-feeding inhibition interval is an interval in which feeding of subsequent pipe instructions during the same cycle as that during which the preceding pipe instruction is fed, i.e., an interval in which feeding of a subsequent pipe instruction to the same data memory 2A is inhibited.

The RSL 20B sets certain two cycles after the feeding of a pipe instruction of the core 3 as a bus-sharing inhibition interval in which sharing of the data bus 6 that is used by the core 3 is inhibited. The bus-sharing inhibition interval corresponds to a predetermined period shorter than a period that is required to execute the preceding pipe instruction, i.e., corresponds to the two cycles after the feeding of the pipe instruction. The bus-sharing inhibition interval is an interval in which feeding of a subsequent pipe instruction for which the same type of data bus as that used for the preceding pipe instruction is used is inhibited.

The tag memory 21 is connected to the control pipeline 10B and the data memories 2A. The tag memory 21 is arranged for each data memory 2A and manages the address of corresponding data in the data memory 2A. The tag memory 21 is, for example, a part of the cache memory 2. The tag memory 21 searches for the address of corresponding data in accordance with a pipe instruction that is fed during a corresponding cycle to the control pipeline 10B. The tag memory 21 manages the address of corresponding data in each core cache memory (not illustrated) in the core 3 in addition to the address of data in the data memories 2A.

When a pipe instructions for which the same data bus 6 is used is sequentially input during a different cycle, the late flag setting unit 22 sets a late flag in association with the pipe instruction. The case in which a pipe instruction for which the same data bus 6 is used is sequentially input during a different cycle corresponds to a case in which, in a pipe-feeding inhibition interval that is required to execute a preceding pipe instruction, a subsequent instruction for which the same data bus 6 as that used for the preceding pipe instruction is fed during a cycle different from that during which the preceding pipe instruction is fed.

Upon detecting feeding of a pipe instruction of the core 3 (C7), which shares the second data bus 6B, during the third cycle after the feeding of a pipe instruction of the core 3 (C3) during the ODD cycle, i.e., upon detecting feeding of a pipe instruction of the core 3 (C7) during the EVEN cycle, the late flag setting unit 22 sets a late flag in association with the pipe instruction.

When the late flag is set in association with the pipe instruction of the core 3, the RSL 20B sets an interval in which sharing of the bus for the pipe instruction is inhibited by extending the interval from the two cycles to the three cycles after the feeding of the pipe instruction. The extended bus-sharing inhibition interval corresponds to the interval, in which feeding of pipe instructions for which the same data bus 6 as that used for the pipe instruction is used is inhibited, in a period that is required to execute a subsequent pipe instruction. When the late flag is set in association with, for example, the pipe instruction of the core 3 (C7), the RSL 20B changes the setting of the bus-sharing inhibition interval in which sharing of the second data bus 6B with the core (C7) is inhibited from two cycles to three cycles.

The LATE-REG 23 is connected to the OSL 15 and the DSL 16. The LATE-REG 23 delays, by one cycle, the transfer timing in the data bus 6. The LATE-REG 23 includes an EVEN-cycle LATE-REG 23A and an ODD-cycle LATE-REG 23B. The LATE-REG 23A delays, by one cycle, the timing in which output data from the OSL-EV 15A is transferred in the data bus 6 in accordance with the late flag that is associated with the EVEN-cycle pipe instruction and outputs the output data to the DSL 16. The LATE-REG 23B delays, by one cycle, the timing in which output data from the OSL-EV 15B is transferred in the data bus 6 in accordance with a late flag that is associated with an EVEN-cycle pipe instruction and outputs the output data to the DSL 16.

Although the configuration of the second cache control unit 500B is different from the configuration illustrated in FIG. 9 in that the second cache control unit 500B controls the data memory 2A (M2 or M3), the substantial configuration of the second cache control unit 500B is almost the same as that of the first cache control unit 500A; therefore redundant description on the configuration and operations will be omitted.

Figure 10:
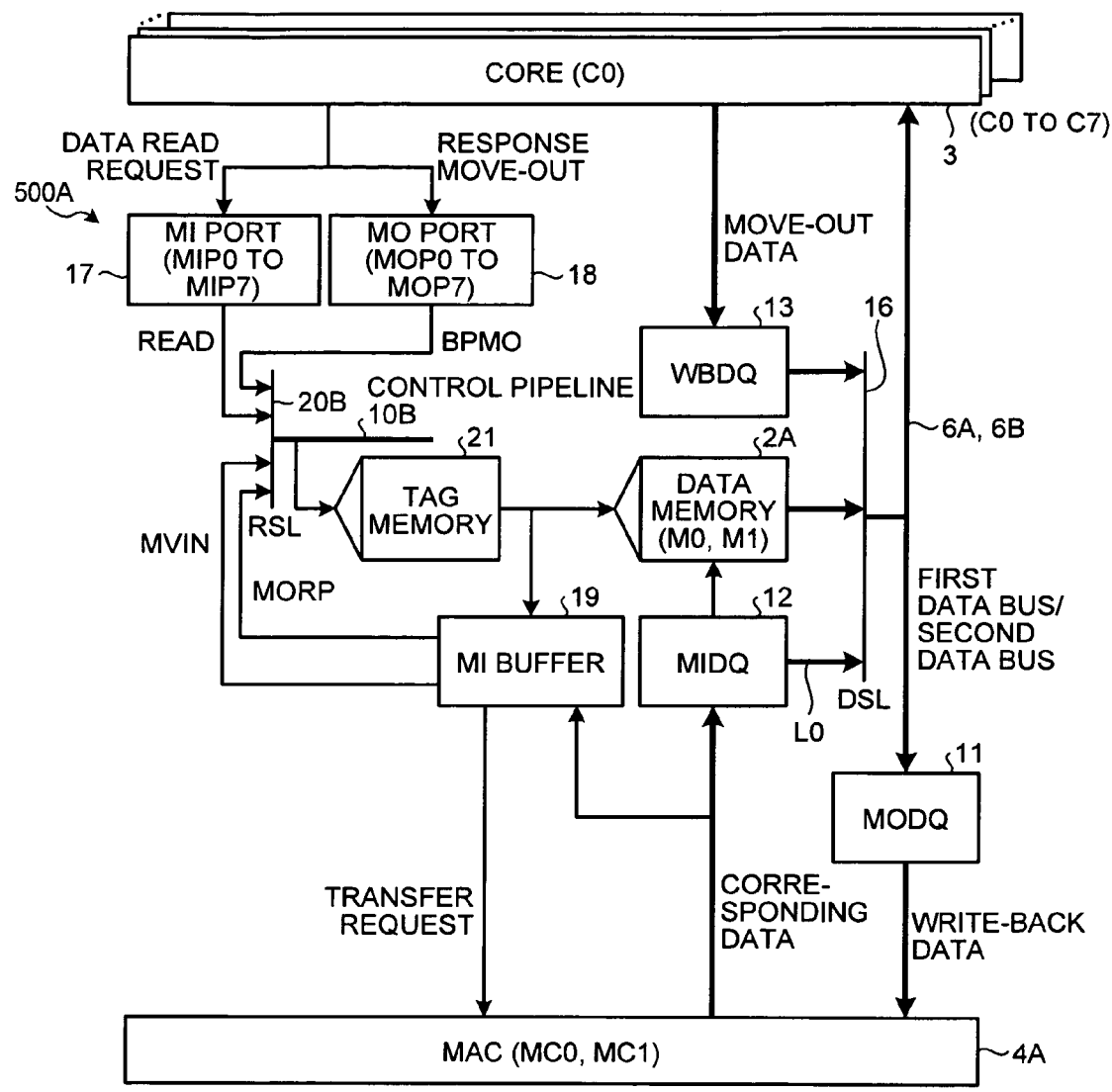
FIG. 10 is an explanatory diagram of an example of a data flow between a core and a first cache control unit and between an MAC and the first cache control unit.

The data flow between the core 3 and the first cache control unit 500A and between the MAC 4 and the first cache control unit 500A will be described below. FIG. 10 is an explanatory view of an example of a data flow between the core 3 and the first cache control unit 500A and between the MAC 4 and the first cache control unit 500A. For example, upon detecting an RD of the core 3 (C0) from the MI port 17, the RSL 20B illustrated in FIG. 10 feeds the RD of the core 3 (C0) during a corresponding cycle (the EVEN cycle or the ODD cycle) to the control pipeline 10B. The tag memory 21 searches for the address that corresponds to data in the data memory 2A (M0 or M1) in accordance with the RD in the control pipeline 10B.

When the address of the corresponding data is in the tag memory 21, the tag memory 21 determines that there is a cache hit and then outputs the address of the data to the data memory 2A. In contrast, when the address of the data is not in the tag memory 21, the tag memory 21 determines that there is a cache miss and then outputs a request for transferring the data corresponding to the cache miss to the MI buffer 19.

In addition, when there is a cache hit, the data memory 2A (M0 or M1) reads corresponding data from the data memory 2A in accordance with the address of the corresponding data in the tag memory 21 and outputs the read corresponding data to the DSL 16 via the OSL 15. The DSL 16 then outputs the corresponding data to the data bus, i.e., the first data bus 6A or the second data bus 6B, that is used for transferring the data for the core 3 (C0) that issues the request.

When there is a cache miss, upon detecting the request for transferring the data corresponding to the cache-miss, the MI buffer 19 notifies the MAC 4A (MC0 or MC1) of the transfer request for transferring the corresponding data to the MIDQ 12. Furthermore, the MI buffer 19 issues an MORP in order to save a free area for registering the corresponding data in the data memory 2A.

Upon detecting the MORP, the RSL 20 feeds the MORP during a corresponding cycle to the control pipeline 10. The tag memory 21 searches for the address of the data corresponding to the MORP from the tag memory 21 in accordance with the MORP in the control pipeline 10B. When the address corresponding to the MORP is in the tag memory 21, for example, when there is the address that is in the core cache memory, the tag memory 21 notifies the core 3 (C0) of the move-out request.

Upon detecting the move-out request, the core 3 (C0) reads corresponding move-out data from the core cache memory. After storing the read data as write-back data in the WBDQ 13, the core 3 (C0) notifies the MO port 18, which corresponds to the core 3 (C0), of a response move-out request.

Upon detecting the response move-out request, the MO port 18 issues a BPMO. Upon detecting the BPMO, the RSL 20B feeds the BPMO of the core 3 (C0) during a corresponding cycle to the control pipeline 10B. The tag memory 21 deletes the address of the data corresponding to the MORP from the tag memory 21 in accordance with the BPMO in the control pipeline 10B and transfers the write-back data from the WBDQ 13 to the MODQ 11 via the DSL 16 and stores the write-back data in the MODQ 11. Furthermore, the first cache control unit 500A issues, to the MAC 4A (MC0 or MC1), a storage request for storing the write-back data, which is stored in the MODQ 11, in the bank memory (MM0 or MM1) of the main storage device.

Upon detecting the storage request, the MAC 4A (MC0 or MC1) reads the write-back data from the MODQ 11 upon completing preparation for storing the write-back data in the main storage device and then stores the write-back data in the bank memory (MM0 or MM1) in the main storage device. After corresponding data from the MAC 4A (MC0 or MC1) is stored in the MIDQ 12, upon detecting a registration request for registering, in the data memory 2A (MM0 or MM1), the data that is stored in the MIDQ 12, the MI buffer 19 issues an MVIN. Upon detecting the MVIN, the RSL 20B feeds the MVIN during a corresponding cycle to the control pipeline 10B.

The tag memory 21 registers the address of the corresponding data in the tag memory 21 in accordance with the MVIN in the control pipeline 10B. Furthermore, while storing the data, which is stored in the MIDQ 12, in the data memory 2A (M0 or M1), the data memory 2A (M0 or M1) transfers the data via the connection line L0 to the core 3 (C0).

For example, when the address corresponding to the MORP is not in the core cache memory in the tag memory 21 when an RD is issued but the address is in the data memory 2A (M0 or M1), the data memory 2A (M0 or M1) reads the corresponding data. The data memory 2A (M0 or M1) then transfers the corresponding data to the MODQ 11 via the QSL 14 and the DSL 16 and stores the data in the MODQ 11. Upon storing the corresponding data, the MODQ 11 issues, to the MAC 4A (MC0 or MC1), a request for storing the corresponding data as write-back data in the bank memory (MM0 or MM1) of the main storage device.

Figure 11:
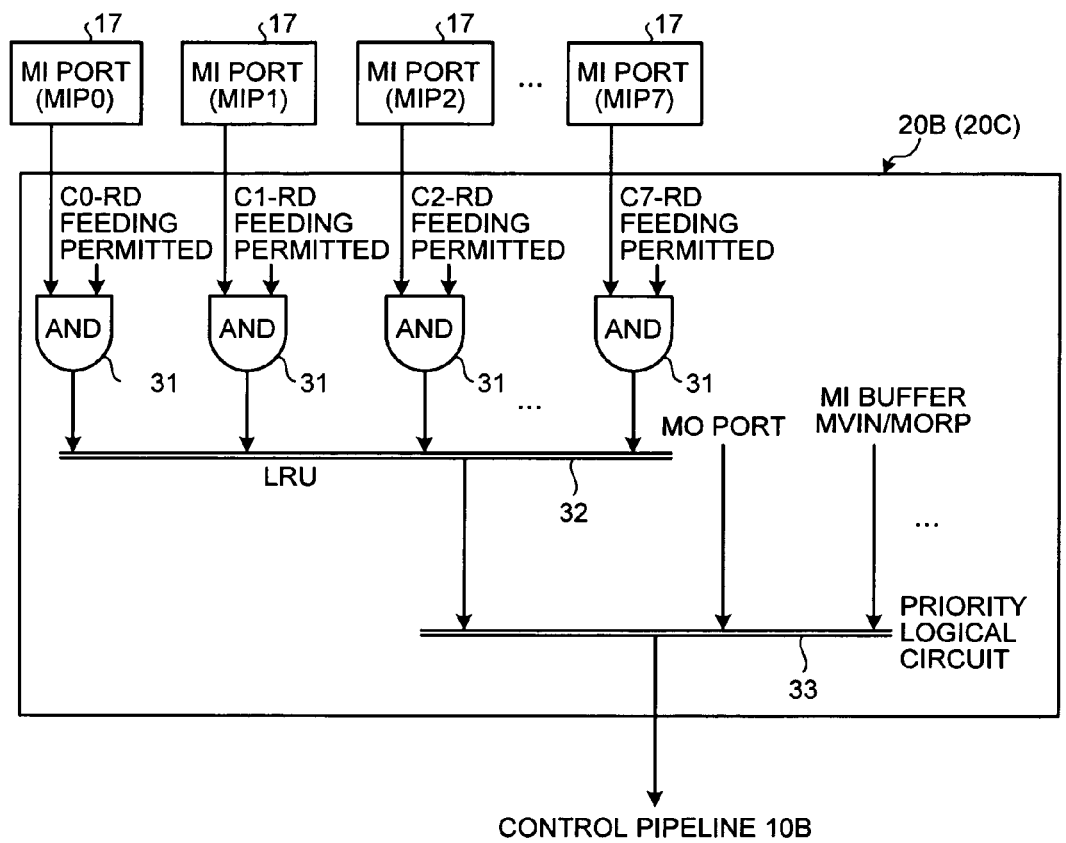
FIG. 11 is an explanatory view of a configuration of an RSL.

A configuration of the RSL 20B will be explained. FIG. 11 is an explanatory diagram of a configuration of the RSL 20B. The RSL 20B illustrated in FIG. 11 includes an AND circuit 31, a least recently used (LRU) 32, and a priority logical circuit 33. The RSL 20B serves as a circuit that feeds pipe instructions from the MI port 17, the MO port 18, and the MI buffer 19 during corresponding cycles to the control pipeline 10B.

The AND circuit 31 is connected to the MI port 17 and the LRU 32. The AND circuit 31 is provided for each MI port 17. Upon detecting a corresponding pipe instruction from the MI port 17, the AND circuit 31 stores the corresponding pipe instruction and outputs the corresponding pipe instruction (RD) in accordance with a feeding permission. The LRU 32 is connected to the AND circuit 31 and the priority logical circuit 33 and outputs the corresponding pipe instruction using an LRU algorithm. The priority logical circuit 33 is connected to the LRU 32, the MO port 18, the MI buffer 19, and the control pipeline 10B and logically outputs pipeline instructions of the LRU 32, the MO port 18, and the MI buffer 19.

Figure 12:
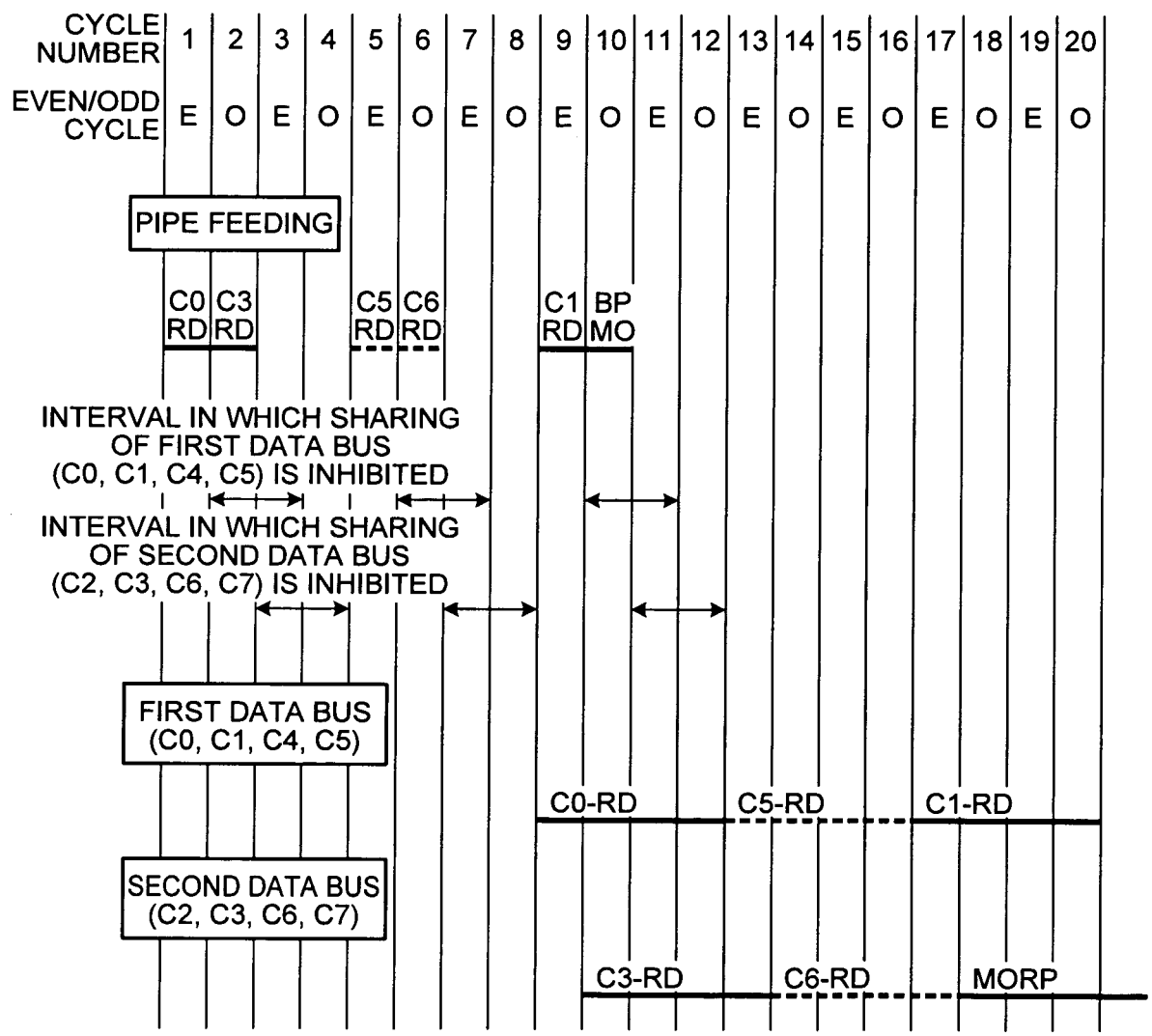
FIG. 12 is an explanatory view illustrating the timing relation in the control pipeline of the first cache control unit according to the third embodiment (a case in which a pipe instruction, for which the same data bus is used, is sequentially fed during the same cycle after a pipe-feeding inhibition interval and a bus-sharing inhibition interval)

Operations of the LSI 1B according to the third embodiment will be explained below. FIG. 12 is an explanatory view illustrating the timing relation in the control pipeline 10B of the first cache control unit 500A according to the third embodiment (a case in which a pipe instruction, for which the same data bus 6 is used, is sequentially fed during the same type of cycle after a pipe-feeding inhibition interval and after a bus-sharing inhibition interval).

The sequential feeding of a pipe instruction means that, after a preceding pipe instruction is fed, a subsequent pipe instruction is fed during the access cycle just after the pipe-feeding inhibition interval and the bus-sharing interval elapse. During the pipe-feeding inhibition interval, feeding of pipe instructions with the same type of cycle as that of the preceding pipe instruction is inhibited, and during the bus-sharing interval, sharing of the same data bus 6 as that used by the preceding pipe instruction is inhibited. Furthermore, the pipe instruction for which the same data bus 6 is used means, in a case where the first data bus 6A is used, pipe instructions for transferring data to the core 3 (C0), the core 3 (C1), the core 3 (C4), the core 3 (C5), or the MODQ-EV 11A. In a case where the second data bus 6B is used, the pipe instructions for which the same data bus 6 is used mean, for example, pipe instructions for transferring data to the core 3 (C2), the core 3 (C3), the core 3 (C6), the core 3 (C7), or the MODQ-OD 11B. In the example illustrated in FIG. 12, the 1st to 20th cycles are divided into EVEN cycles and ODD cycles. The first cache control unit 500A accesses the data memory 2A (M0) during the EVEN cycle and accesses the data memory 2A (M1) during the ODD cycle.

For example, upon detecting a data read request from the core 3 (C0) to the data memory 2A (M0), the MI port 17 (MI0) in the first cache control unit 500A issues an RD. The RSL 20B feeds the RD of the core 3 (C0) during the first cycle (EVEN cycle) to the control pipeline 10B. The RSL 20B sets the three cycles from the 2nd cycle to the 4th cycle after the feeding of the RD of the core 3 (C0) as an EVEN-cycle pipe-feeding inhibition interval. The RSL 20B further sets the two cycles in the period between the 2nd cycle and the 3rd cycle after the feeding of the RD of the core 3 (C0) as an interval in which sharing of the first data bus 6A is inhibited.

After the feeding of the RD of the core 3 (C0), the DSL 16 in the first cache control unit 500A starts data transfer in the first data bus 6A during the 9th cycle (EVEN cycle) in order to transfer corresponding data from the data memory 2A (M0) to the core 3 (C0), which issues the request. The first data bus 6A transfers the corresponding data to the core 3 (C0) in the four cycles in the period from the 9th cycle (EVEN cycle) to the 12th cycle.

For example, upon detecting a data read request from the core 3 (C3) to the data memory 2A (M1), the MI port 17 (MI3) issues an RD. The RSL 20B feeds the RD of the core 3 (C3) during the 2nd cycle (ODD cycle) to the control pipeline 10. The RSL 20B sets the three cycles in the period from the 3rd cycle to the 5th cycle after the feeding of the RD of the core 3 (C3) as an ODD-cycle pipe-feeding inhibition interval. The RSL 20B further sets the two cycles in the period between the 3rd cycle and the 4th cycle after the feeding of the RD of the core 3 (C3) as an interval in which sharing of the second data bus 6B is inhibited.

After the feeding of the RD of the core 3 (C3), the DSL 16 starts data transfer in the second data bus 6B during the 10th cycle (ODD cycle) in order to transfer corresponding data from the data memory 2A (M1) to the core 3 (C3), which issues the request. The second data bus 6B transfers the corresponding data for the core 3 (C3) in the four cycles in the period from the 10th cycle (ODD cycle) to the 13th cycle.

For example, upon detecting a data read request from the core 3 (C5) to the data memory 2A (M0), the MI port 17 (MI5) issues an RD. The RSL 20B feeds the RD of the core 3 (C5) during the 5th cycle (EVEN cycle) to the control pipeline 10B after the EVEN-cycle pipe-feeding inhibition interval and after the interval in which sharing of the first data bus 6A is inhibited. The RSL 20B sets the three cycles in the period from the 6th cycle to the 8th cycle after the feeding of the RD of the core 3 (C5) as an EVEN-cycle pipe-feeding inhibition interval. The RSL 20B further sets the two cycles in the period between the 6th cycle and the 7th cycle after the feeding of the RD of the core 3 (C5) as an interval in which sharing of the first data bus 6A is inhibited.

After the feeding of the RD of the core 3 (C5), the DSL 16 starts data transfer in the first data bus 6A during the 13th cycle (EVEN cycle) in order to transfer corresponding data from the data memory 2A (M0) to the core 3 (C5), which issues the request. The first data bus 6A transfers the corresponding data for the core 3 (C5) in the four cycles in the period from the 13th cycle (EVEN cycle) to the 16th cycle.

For example, upon detecting a data read request from the core 3 (C6) to the data memory 2A (M1), the MI port 17 (MI6) issues an RD. The RSL 20B feeds the RD of the core 3 (C6) during the 6th cycle (ODD cycle) to the control pipeline 10B after the ODD-cycle pipe-feeding inhibition interval and after the interval in which sharing of the second data bus 6B is inhibited. The RSL 20B sets the three cycles in the period from the 7th cycle to the 9th cycle after the feeding of the RD of the core 3 (C6) as an ODD-cycle pipe-feeding inhibition interval. Furthermore, the RSL 20B sets the two cycles in the period between the 7th cycle and the 8th cycle after the feeding of the RD of the core 3 (C6) as an interval in which sharing of the second data bus 6B is inhibited.

After the feeding of the RD of the core 3 (C6), the DSL 16 starts data transfer in the second data bus 6B during the 14th cycle (ODD cycle) in order to transfer corresponding data from the data memory 2A (M1) to the core 3 (C6), which issues the request. The second data bus 6B transfers the corresponding data for the core 3 (C6) in the four cycles in the period from the 14th cycle (ODD cycle) to the 17th cycle.

For example, upon detecting a data read request from the core 3 (C1) to the data memory 2A (M0), the MI port 17 (MI1) issues an RD. The RSL 20B feeds the RD of the core 3 (C1) during the 9th cycle (EVEN cycle) to the control pipeline 10B after the EVEN-cycle pipe-feeding inhibition interval and after the interval in which sharing of the first data bus 6A is inhibited. The RSL 20B sets the three cycles in the period from the 10th cycle to the 12th cycle after the feeding of the RD of the core 3 (C1) as an EVEN-cycle pipe-feeding inhibition interval. The RSL 20B further sets the two cycles in the period between the 10th cycle and the 11th cycle as an interval in which sharing of the first data bus 6A is inhibited.

After the feeding of the RD of the core 3 (C1), the DSL 16 starts data transfer in the first data bus 6A during the 17th cycle (EVEN cycle) in order to transfer corresponding data from the data memory 2A (M0) to the core 3 (C1), which issues the request. The first data bus 6A transfers the corresponding data for the core 3 (C1) in the four cycles in the period from the 17th cycle (EVEN cycle) to the 20th cycle.

For example, upon detecting, from the core 3 (C3), a move-out request for a move-out from the WBDQ-OD 13B to the MODQ-OD 11B, the MO port 18 (MO3) issues a BPMO. The RSL 20B feeds the BPMO of the core 3 (C3) during the 10th cycle (ODD cycle) to the control pipeline 10B, for accessing the WBDQ-OD 13B, after the ODD-cycle pipe-feeding inhibition interval and after the interval in which sharing of the second data bus 6B is inhibited. The RSL 20B sets the three cycles in the period from the 11th cycle to the 13th cycle after the feeding of the BPMO of the core 3 (C3) as an ODD-cycle pipe-feeding inhibition interval. The RSL 20B further sets the two cycles in the period between the 11th cycle and the 12th cycles after feeding of the BPMO of the core 3 (C3) as an interval in which sharing of the second data bus 6B is inhibited.

After the feeding of the BPMO, the DSL 16 starts data transfer in the second data bus 6B during the 18th cycle (ODD cycle) in order to transfer corresponding data from the WBDQ-OD 13B to the MODQ-OD 11B. The second data bus 6B transfers the corresponding data to the MODQ-OD 11B in the four cycles in the period from the 18th cycle (ODD cycle) to the 21st cycle. Accordingly, in the first data bus 6A, when pipe instructions are fed sequentially during an EVEN cycle every four cycles, corresponding data for the core 3 (C0), the core 3 (C5), and the core 3 (C1) can be sequentially transferred from the data memory 2A (M0) without intermittency. In the second data bus 6B, when pipe instructions are fed sequentially during an ODD cycle at every four cycles, corresponding data for the core 3 (C3), the core 3 (C6), and the MODQ-OD 11B can be sequentially transferred from the data memory 2A (M1) and the WBDQ-OD 13B without intermittency.

As illustrated in FIG. 12, when subsequent pipe instructions, for which the same data bus 6 as that used for a preceding pipe instruction is used, are sequentially fed during the same type of cycle as that during which the preceding pipe instruction is fed after the pipe-feeding inhibition interval and after the bus-sharing inhibition interval for the preceding pipe instruction, the data corresponding to the pipe instructions are sequentially transferred in the data bus 6 without intermittency. Accordingly, stable data transfer efficiency can be ensured in the data bus 6 without requiring a complicated bus structure. For example, when pipe instructions, for which the first data bus 6A is used, are sequentially fed during the same type of cycle, stable data transfer efficiency can be ensured in the first data bus 6A. Similarly, when pipe instructions, for which the second data bus 6B is used, are sequentially fed during the same type of cycle, stable data transfer efficiency can be ensured in the second data bus 6B.

Figure 13:
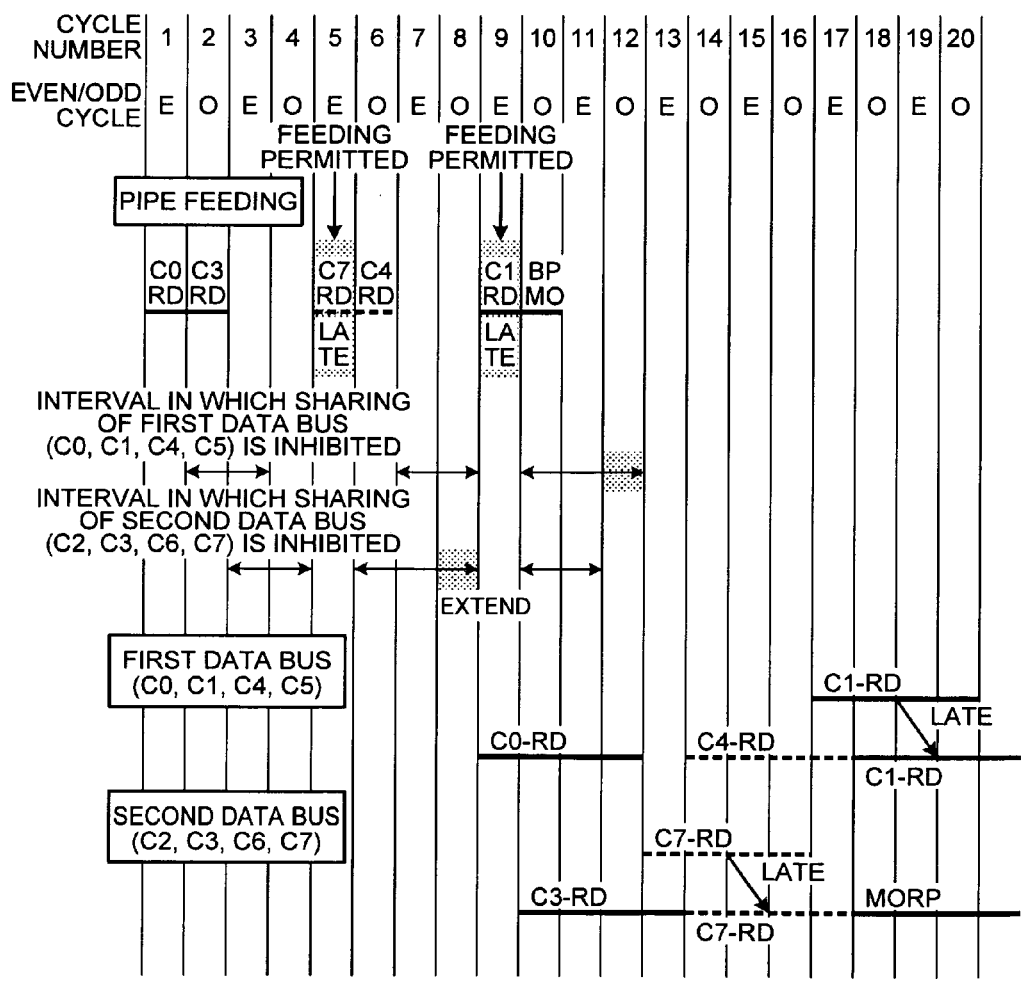
FIG. 13 is an explanatory view illustrating the timing relation in the control pipeline of the first cache control unit according to the third embodiment (a case in which a pipe instruction, for which the same data bus is used, is sequentially fed during a different cycle in a pipe-feeding inhibition interval)

Operations of the first cache control unit 500A will be explained below that assure stable data transfer efficiency in the data bus 6 even when a pipe instruction for which the same data bus 6 as that used for a preceding pipe instruction is used is fed during a cycle different from that during which the preceding instruction is fed. FIG. 13 is an explanatory view illustrating the timing relation in the control pipeline 10B of the first cache control unit 500A according to the third embodiment (a case in which a pipe instruction for which the same data bus 6 is used is sequentially fed during a different cycle in a pipe-feeding inhibition interval).

For example, upon detecting a data read request from the core 3 (C0) to the data memory 2A (M0), the MI port 17 (MI0) issues an RD. The RSL 20B feeds the RD of the core 3 (C0) during the 1st cycle (EVEN cycle) to the control pipeline 10B. The RSL 20B sets the three cycles in the period from the 2nd cycle to the 4th cycle after the feeding of the RD of the core 3 (C0) as an EVEN-cycle pipe-feeding inhibition interval. The RSL 20B further sets the two cycles between the 2nd cycle and the 3rd cycle after the feeding of the RD of the core 3 (C0) as an interval in which sharing of the first data bus 6A is inhibited.

After the feeding of the RD of the core 3 (C0), the DSL 16 starts data transfer in the first data bus 6A during the 9th cycle (EVEN cycle) in order to transfer corresponding data from the data memory 2A (M0) to the core 3 (C0), which issues the request. The first data bus 6A transfers the corresponding data for the core 3 (C0) in the four cycles in the period from the 9th cycle (EVEN cycle) to the 12th cycle.

For example, upon detecting a data read request from the core 3 (C3) to the data memory 2A (M1), the MI port 17 (MI3) issues an RD. The RSL 20B feeds the RD of the core 3 (C3) during the 2nd cycle (ODD cycle) to the control pipeline 10B. The RSL 20B sets the three cycles in the period from the 3rd cycle to the 5th cycle after the feeding of the RD of the core 3 (C3) as an ODD-cycle pipe-feeding inhibition interval. The RSL 20B further sets the two cycles in the period between the 3rd cycle and the 4th cycle after the feeding of the RD of the core 3 (C3) as an interval in which sharing of the second data bus 6B is inhibited.

After the feeding of the RD of the core 3 (C3), the DSL 16 starts data transfer in the second data bus 6B during the 10th cycle (ODD cycle) in order to transfer corresponding data from the data memory 2A (M1) to the core 3 (C3), which issues the request. The second data bus 6B transfers the corresponding data for the core 3 (C3) in the four cycles in the period from the 10th cycle (ODD cycle) to the 13th cycle.

For example, upon detecting a data read request from the core 3 (C7) to the data memory 2A (M0), the MI port 17 (MI7) issues an RD. The 5th cycle (EVEN cycle) is after the EVEN-cycle pipe-feeding inhibition interval (2nd to 4th cycles) and the interval in which sharing of the second data bus 6B is inhibited (3rd and 4th cycles); therefore, the RSL 20B feeds the RD of the core 3 (C7) during the fifth cycle (EVEN cycle).

However, the core 3 (C3) and the core 3 (C7) share the second data bus 6B; therefore, the data for the core 3 (C3) and the data for the core 3 (C7) in the second data bus 6B will interfere with each other during the 13th cycle. For this reason, in order to delay, by one cycle, the timing from the 13th cycle to the 16th cycle for transferring data in the second data bus 6B to the core 3 (C7), the late flag setting unit 22 sets a late flag in association with the RD of the core 3 (C7) in the RSL 20B. When the late flag is set, the RSL 20B sets the interval in which sharing of the second data bus 6B is inhibited by extending the interval to the three cycles in the period from the 6th cycle to the 8th cycle after the feeding of the RD of the core 3 (C7). The RSL 20B sets the three cycles in the period from the 6th cycle to the 8th cycle after the feeding of the RD of the core 3 (C7) as an EVEN-cycle pipe-feeding inhibition interval.

In accordance with the setting of the late flag for the RD of the core 3 (C7), the DSL 16 outputs an output from the LATE-REG 23B, which is the one-cycle-delayed EVEN-cycle data for the core 3 (C7) in the second data bus 6B. In other words, the DSL 16 delays, by one cycle, the data for the core 3 (C7) during the 13th to 16th cycles in accordance with the output from the LATE-REG 23B and outputs the data during the 14th to 17th cycles. Accordingly, the DSL 16 starts data transfer to the core 3 (C7) in the second data bus 6B during the 14th cycle just after completion of data transfer to the core 3 (C3). Thus, the data for the core 3 (C3) and the data for the core 3 (C7) can be sequentially transferred in the second data bus 6B without data interference.

Furthermore, for example, upon detecting a data read request from the core 3 (C4) to the data memory 2A (M1), the MI port 17 (MI4) issues an RD. The RSL 20B feeds the RD of the core 3 (C4) during the 6th cycle (ODD cycle) to the control pipeline 10B after the ODD-cycle pipe-feeding inhibition interval and after the interval in which sharing of the first data bus 6A is inhibited. The RSL 20B sets the three cycles in the period from the 7th cycle to the 9th cycle after the feeding of the RD of the core 3 (C4) as an ODD-cycle pipe-feeding inhibition interval. The RSL 20B further sets the two cycles in the period between the 7th cycle and the 8th cycle after the feeding of the RD of the core 3 (C4) as an interval in which sharing of the first data bus 6A is inhibited.

After the feeding of the RD of the core 3 (C4), the DSL 16 starts data transfer in the first data bus 6A during the 14th cycle (ODD cycle) in order to transfer corresponding data from the data memory 2A (M1) to the core 3 (C4), which issues the request. The first data bus 6A transfers the corresponding data for the core 3 (C4) in the four cycles in the period from the 14th cycle (ODD cycle) to the 17th cycle.

For example, upon detecting a data read request from the core 3 (C1) to the data memory 2A (M0), the MI port 17 (MI1) issues an RD. The RSL 20B feeds the RD of the core 3 (C1) during the 9th cycle (EVEN cycle) to the control pipeline 10B after the EVEN-cycle pipe-feeding inhibition interval (6th to 8th cycles) and the interval in which sharing of the first data bus 6A is inhibited (7th to 8th cycles).

However, the core 3 (C4) and the core 3 (C1) share the first data bus 6A; therefore, the data for the core 3 (C4) and the data for the core 3 (C1) in the first data bus 6A will interfere with each other during the 17th cycle. For this reason, in order to delay, by one cycle, the timing from the 17th cycle to the 20th cycle for transferring data in the first data bus 6A to the core 3 (C1), the late flag setting unit 22 sets a late flag in association with the RD of the core 3 (C1) in the RSL 20B. When the late flag is set, the RSL 20B sets the interval in which sharing of the first data bus 6A is inhibited by extending the interval to the three cycles in the period from the 10th cycle to the 12th cycle after the feeding of the RD of the core 3 (C1). The RSL 20B sets the three cycles in the period from the 10th cycle to the 12th cycle after the feeding of the RD of the core 3 (C1) as an EVEN-cycle pipe-feeding inhibition interval.

In accordance with the setting of the late flag for the RD of the core 3 (C1), the DSL 16 outputs an output from the LATE-REG 23B, which is the one-cycle-delayed EVEN-cycle data for the core 3 (C1) in the first data bus 6A. In other words, the DSL 16 delays, by one cycle, the data for the core 3 (C1) during the 17th to 20th cycles in accordance with the output from the LATE-REG 23B and outputs the data during the 18th to 21st cycles. Accordingly, the DSL 16 starts data transfer to the core 3 (C1) in the second data bus 6B during the 14th cycle just after completion of data transfer to the core 3

(C4). Thus, the data for the core 3 (C4) and the data for the core 3 (C1) can be sequentially transferred in the first data bus 6A without data interference.

As described above, in the third embodiment, after a pipe-feeding inhibition interval and after a bus-sharing inhibition interval, when a subsequent pipe instruction for which the same data bus 6 as that used for a preceding pipe instruction is used is sequentially fed during a cycle different from that during which the preceding pipe instruction is fed, the timing in which the subsequent data corresponding to the subsequent pipe instruction is transferred is delayed by one cycle. In the data bus 6, the preceding data corresponding to the preceding pipe instruction and the subsequent data corresponding to the subsequent instruction are sequentially transferred without interference. Accordingly, stable data transfer efficiency can be ensured in the data bus 6 without having a complicated bus structure.

In the third embodiment, when a subsequent pipe instruction for which the same data bus 6 as that used for a preceding pipe instruction is used is sequentially fed during a cycle different from that during which the preceding pipe instruction is fed, a late flag is set in association with the subsequent pipe instruction in the RSL 20B. In accordance with the setting of the late flag, the LATE-REG 23A (23B) can delay, by one cycle, the timing in which the subsequent data corresponding to the subsequent pipe instruction in the data bus 6 is transferred.

In the third embodiment, when a late flag is set in association with a subsequent pipe instruction in the RSL 20B, the interval in which sharing of the same data bus 6 is inhibited after the feeding of the pipe instruction is extended by one cycle, i.e., extended to three cycles. This ensures prevention of data interference in the subsequent data and the following data, which is data interference caused by delaying, by one cycle, the data output in the same data bus 6.

Figure 14:
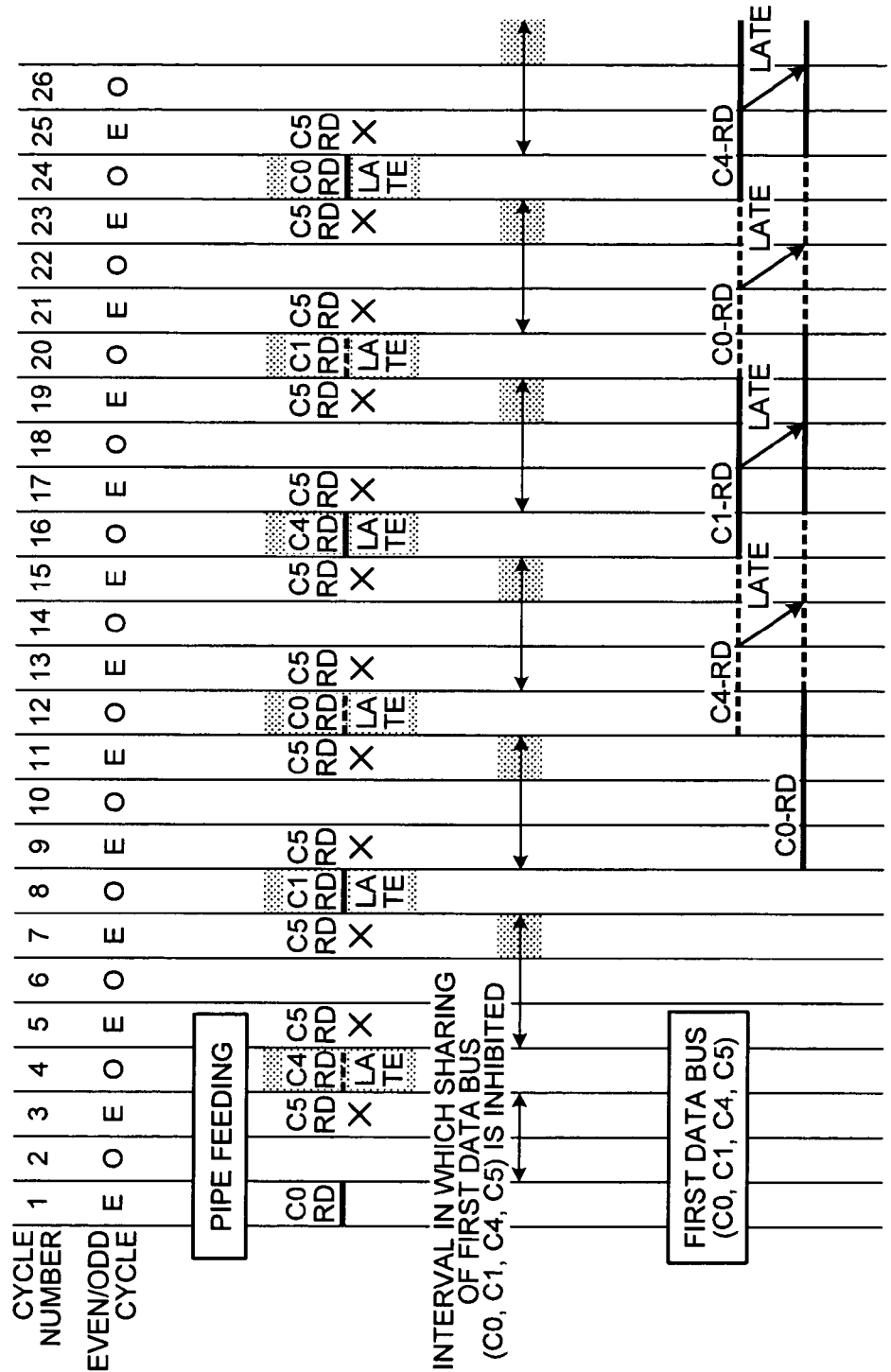
FIG. 14 is an explanatory view of the timing relation in the control pipeline of the first cache control unit according to the third embodiment (a case in which irregularity is caused in access cycles)

In the third embodiment, when a subsequent pipe instruction for which the same data bus 6 as that used for a preceding pipe instruction is used is sequentially fed during a cycle different from that during which the preceding pipe instruction is fed, a bus-sharing inhibition interval for the subsequent pipe instruction is set by extending the interval to three cycles after the feeding of the pipe instruction. However, when the interval in which sharing of the bus for the subsequent pipe instruction is inhibited is extended to the three cycles after the feeding of the pipe instruction, a subsequent pipe instruction that is fed at a cycle different from the subsequent pipe instruction and for which the same data bus 6 is used is inhibited intermittently and thus irregularity is caused in the access cycles. FIG. 14 is an explanatory view of the timing relation in the control pipeline 10B of the first cache control unit 500A (a case in which irregularity is caused in access cycles). FIG. 14 illustrates an example in which 1st to 26th cycles are divided into EVEN cycles and ODD cycles.

As illustrated in FIG. 14, for example, after an RD of the core 3 (C0) is fed during the 1st cycle (EVEN cycle), even if an RD of the core 3 (C5) is detected during the 3rd cycle (EVEN cycle) in the interval in which sharing of the first data bus 6A is inhibited, the RSL 20B inhibits feeding of an RD during the 3rd cycle. After the interval in which sharing of the first data bus 6A is inhibited, when an RD of the core 3 (C4) is fed during the 4th cycle (ODD cycle) to the control pipeline 10B, the late flag setting unit 22 sets a late flag to the RD of the core 3 (C4) in the RSL 20B. When the late flag is set, the RSL 20B sets the bus-sharing inhibition interval after the feeding of the RD of the core 3 (C4) during the 4th cycle by extending the interval to the three cycles in the period from the 5th cycle to the 7th cycle. The RSL 20B sets the three cycles in the period from the 5th cycle to the 7th cycle after the feeding of the RD of the core 3 (4) as an ODD-cycle pipe-feeding inhibition interval.

Accordingly, even if an RD of the core 3 (C5) is detected during the 7th cycle (EVEN cycle) in the three-cycle bus-sharing inhibition interval after the feeding of the RD of the core 3 (C4), the RSL 20B again inhibits feeding of the RD to the control pipeline 10B.

Furthermore, in accordance with the setting of the late flag for the RD of the core 3 (C4), the DSL 16 delays, by one cycle, the data for the core 3 (C4) in the first data bus 6A using an output of the LATE-REG 23A during the EVEN cycle. As a result, the preceding data for the core 3 (C0) and the subsequent data for the core 3 (C4) can be sequentially transferred in the first data bus 6A without data interference.

Thereafter, after the interval in which sharing of the first data bus 6A is inhibited (5th to 7th cycles), when an RD of the core 3 (C1) is fed during the 8th cycle (ODD cycle), the late flag setting unit 22 sets a late flag to the RD of the core 3 (C1) in the RSL 20B. When the late flag is set, the RSL 20B sets the bus-sharing inhibition interval after the feeding of the RD by extending the interval to the three cycles in the period from the 9th cycle to the 11th cycle. The RSL 20B sets the three cycles from the 9th cycle to the 11th cycle after the feeding of the RD of the core 3 (C1) as an ODD-cycle pipe-feeding inhibition interval.

Accordingly, even if an RD of the core 3 (C5) is detected during the 11th cycle (EVEN cycle) in the three-cycle bus-sharing inhibition interval after the feeding of the RD of the core 3 (C1), the RSL 20B again inhibits feeding of the RD to the control pipeline 10B. Furthermore, in accordance with the setting of the late flag for the RD of the core 3 (C1), the DSL 16 delays, by one cycle, the data for the core 3 (C1) in the first data bus 6A using an output of the LATE-REG 23B during the ODD cycle. As a result, the preceding data for the core 3 (C4) and the subsequent data for the core 3 (C1) can be sequentially transferred in the first data bus 6A without data interference.

For example, when a pipe instruction to which a late flag is set and for which the first data bus 6A is used is sequentially fed during the ODD cycle, an interval in which the sharing of the first data bus 6A is inhibited is set by extending, by one cycle, the interval to the three cycles after the feeding of the pipe instruction. As a result, the interval in which the use of the first data bus 6A is inhibited is set intermittently to the three cycles after the ODD cycle. Thus, feeding of an EVEN-cycle pipe instruction for which the first data bus 6A is used is inhibited intermittently, which causes irregularity in the access cycles.

Figure 15:
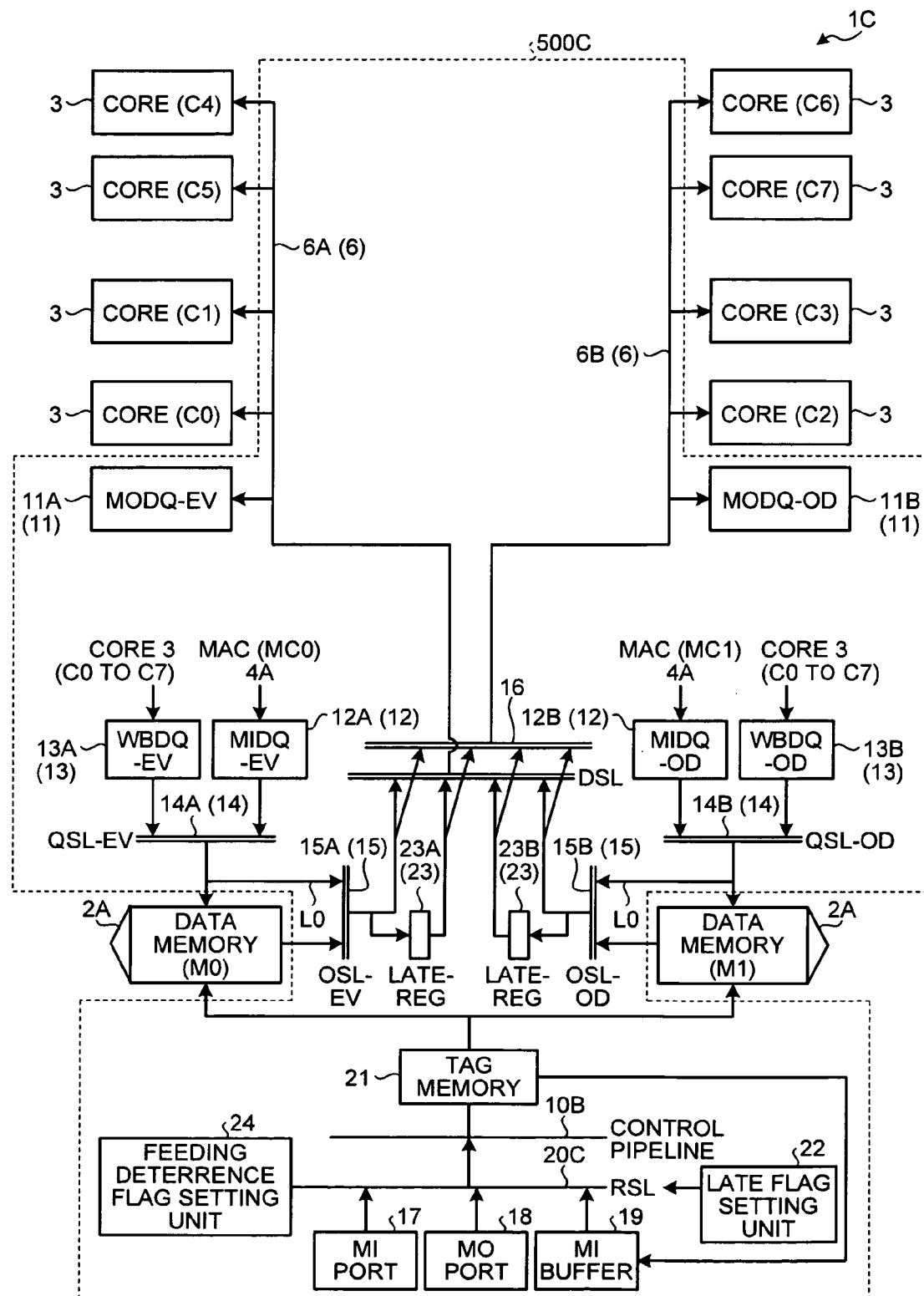
FIG. 15 is a block diagram of a configuration of a first cache control unit according to a fourth embodiment of the present invention.

To deal with such irregularity in access cycles, an LSI with a function of preventing irregularity in access cycles in the control pipeline 10B will be described below as a fourth embodiment of the present invention. Components the same as those of the third embodiment are denoted by the same reference numerals as those of the third embodiments and detail description for them will be omitted below. FIG. 15 is a block diagram of a configuration of a first cache control unit according to the fourth embodiment.

An LSI 1C according to the fourth embodiment is different from the LSI 1B according to the third embodiment in that, as illustrated in FIG. 15, a first cache control unit 500C (a second cache control unit 500D) includes an RSL 20C and a feeding deterrence flag setting unit 24.

When a late flag is set in association with a pipe instruction of the core 3 for which the same data bus 6 is used and when another pipe instruction for a different cycle for which the same data bus 6 is used waits for feeding, the feeding deterrence flag setting unit 24 sets a feeding deterrence flag to the core 3 from which the pipe instruction is issued and its adjacent core 3 in order to inhibit feeding of the pipe instructions during the same cycle. The adjacent core 3 is, for example, the core 3 (C0) for the core 3 (C1), the core 3 (C2) for the core 3 (C3), the core 3 (C4) for the core 3 (C5), and the core 3 (C6) for the core 3 (C7), and vice versa.

Upon detecting, during the same cycle, a pipe instruction of the core 3 to which a feeding deterrence flag is set, the RSL 20C inhibits feeding permission for the AND circuit (see FIG. 11) corresponding to the core 3 in accordance with the feeding deterrence flag. Upon detecting, during a different cycle, a pipe instruction of the core 3 to which no feeding deterrence flag is set, the RSL 20C permits feeding by the AND circuit 31 corresponding to the core 3 after a normal pipe-feeding inhibition interval and a bus-sharing inhibition interval. Upon detecting, during a cycle different from that of a feeding deterrence flag setting, a pipe instruction of the core 3 to which a feeding deterrence flag is set, the RSL 20C permits feeding by the AND circuit 31 corresponding to the core 3 after the normal pipe-feeding inhibition interval and the bus-sharing inhibition interval. For example, upon detecting an EVEN-cycle pipe instruction of the core 3 to which a feeding deterrence flag for inhibiting feeding of a pipe instruction during the ODD cycle is set, the RSL 20C permits feeding by the AND circuit 31 corresponding to the core 3 after the normal pipe-feeding inhibition interval and the bus-sharing inhibition interval.

When feeding of a pipe instruction of a cycle different from the cycle of the feeding deterrence flag that has been set is detected, the feeding deterrence flag setting unit 24 releases the feeding deterrence flag for all the core 3 to which the feeding deterrence flag is set. Although the configuration of the second cache control unit 500D is different from the configuration illustrated in FIG. 15 in that the second cache control unit 500D controls the data memory 2A (M2 or M3), the substantial configuration of the second cache control unit 500D is almost the same as that of the first cache control unit 500C; therefore redundant description on the configuration and operations will be omitted.

Figure 16:
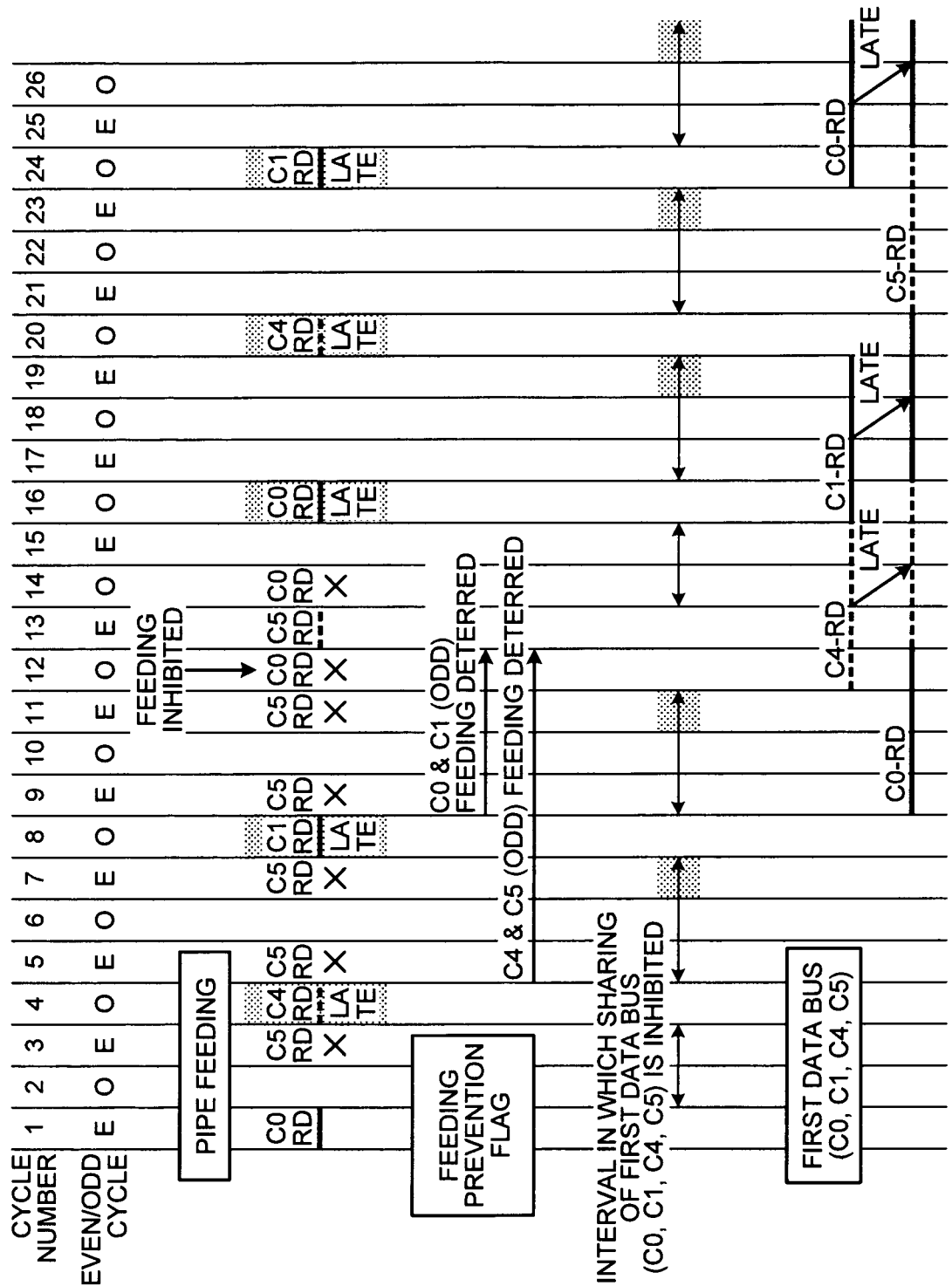
FIG. 16 is an explanatory view illustrating the timing relation in a control pipeline of the first cache control unit according to the fourth embodiment (a case in which irregularity in access cycles is prevented).

Operations of the LSI 1C according to the fourth embodiment will be described below. FIG. 16 is an explanatory view illustrating the timing relation in the control pipeline 10B of the first cache control unit 500C (a case in which irregularity in access cycles is prevented). FIG. 16 illustrates an example in which 1st to 26th cycles are divided into EVEN cycles and ODD cycles.

As illustrated in FIG. 16, upon detecting a data read request from the core 3 (C0) to the data memory 2A (M0), the MI port 17 the MI port 17 (MI1) issues an RD. The RSL 20C feeds the RD of the core 3 (C0) at the 1st cycle (EVEN cycle) to the control pipeline 10B. The RSL 20C sets the three cycles in the period from the 2nd cycle to the 4th cycle after the feeding of the RD of the core 3 (C0) as an EVEN-cycle pipe feeding inhibition interval. The RSL 20C further sets the two cycles in the period between the 2nd cycle and the 3rd cycle after the feeding of the RD for the core 3 (C0) as an interval in which sharing of the first data bus 6A is inhibited.

Upon detecting a data read request of the core 3 (C5) at the 3rd cycle in the interval in which sharing of the first data bus 6A is inhibited (2nd and 3rd cycles), the MI port 17 (MI5) issues an RD. However, because the RD of the core 3 (C5) is in the interval in which sharing of the first data bus 6A is inhibited (2nd and 3rd cycles), the RSL 20C inhibits feeding of the RD of the core 3 (C5) during the third cycle (EVEN cycle).

After the interval in which sharing of the first data bus 6A is inhibited and the ODD-cycle pipe-feeding inhibition interval, upon detecting a data read request for the core 3 (C4) during the 4th cycle (the closest ODD cycle), the MI port 17 (MI4) issues an RD. Because the pipe-feeding inhibition interval and the bus-sharing inhibition interval have passed, the RSL 20C feeds the RD of the core 3 (C4) during the 4th cycle (ODD cycle).

The late flag setting unit 22 sets a late flag to the RD of the core 3 (C4) during the 4th cycle (ODD cycle) in the RSL 20C. When a late flag is set, the RSL 20C sets an interval in which sharing of the first data bus 6A is inhibited by extending the interval to the three cycles in the period from the 5th cycle to the 7th cycle after the feeding of the RD of the core 3 (4). The RSL 20C also sets the three cycles from the 5th cycle to the 7th cycle after the feeding of the RD of the core 3 (C4) as an ODD-cycle pipe-feeding inhibition interval.

When a late flag is set in association with the RD of the core 3 (C4) during the 4th cycle (ODD cycle), the feeding deterrence flag setting unit 24 sets a feeding deterrence flag, for deterring a pipe instruction during the ODD cycle, to the core 3 (C4) and its adjacent core 3 (C5). As a result, upon detecting ODD-cycle pipe instructions of the core 3 (C4) and the core 3 (C5), the RSL 20C inhibits feeding of the pipe instructions during ODD cycles.

In accordance with the late flag for the RD of the core 3 (C4), the DSL 16 outputs, as subsequent data for the core 3 (C4) in the first data bus 6A, a one-cycle-delayed ODD-cycle output of the LATE-REG 23B. In the first data bus 6A, the preceding data for the core 3 (C0) and the subsequent data for the core 3 (C4) can be sequentially transferred without data interference.

For example, after the interval in which sharing of the first data bus 6A is inhibited and the ODD-cycle pipe-feeding inhibition interval, upon detecting a data read request of the core 3 (C1) during the 8th cycle (the closest ODD cycle), the MI port 17 (MI1) issues an RD. Because the pipe-feeding inhibition interval and the bus-sharing inhibition interval have passed, the RSL 20C feeds the RD of the core 3 (C1) during the 8th cycle (ODD cycle).

The late flag setting unit 22 sets a late flag in association with the RD of the core 3 (C1) during the ODD cycle in the RSL 20C. When the late flag is set, the RSL 20C sets an interval in which sharing of the first data bus 6A is inhibited by extending the interval to the three cycles in the period from the 9th cycle to the 11th cycle after the feeding of the RD of the core 3 (C1). The RSL 20C further sets the three cycles in the period from the 9th cycle to the 11th cycle after the feeding of the RD of the core 3 (C1) as an ODD-cycle pipe-feeding inhibition interval.

Furthermore, when the late flag is set in association with the ODD-cycle RD of the core 3 (C1) during the 8th cycle, the feeding deterrence flag setting unit 24 sets a feeding deterrence flag, for deterring feeding of ODD-cycle pipe instructions, to the core 3 (C1) and its adjacent core 3 (C0). Accordingly, when ODD-cycle pipe instructions of the core 3 (C1) and the core (C0) are detected, the RSL 20C inhibits feeding of the ODD-cycle pipe instructions.

In accordance with the late flag for the RD of the core 3 (C1), the DSL 16 outputs, as subsequent data for the core 3 (C1) in the first data bus 6A, a one-cycle-delayed ODD-cycle output of the LATE-REG 23B. In the first data bus 6A, the preceding data for the core 3 (C4) and the subsequent data for the core 3 (C1) can be sequentially transferred without data interference.

For example, upon detecting a data read request of the core 3 (C0) during the 12th cycle (ODD cycle) after the interval in which sharing of the first data bus 6A is inhibited and the ODD-cycle pipe-feeding inhibition interval, the MI port 17 (MI0) issues an RD. However, because the feeding deterrence flag is set to the core 3 (C0), the RSL 20C inhibits feeding of the pipe instruction of the core 3 (C0) upon detecting the RD of the core 3 (C0) during the 12th cycle (ODD cycle).

Accordingly, after the ODD-cycle pipe-feeding inhibition interval and after the interval in which sharing of the first data bus 6A is inhibited, upon detecting an RD of the core 3 (C5) during the 13th cycle (EVEN cycle), the RSL 20C feeds the RD of the core 3 (C5) during this EVEN cycle. The RSL 20C sets the three cycles in the period from the 14th cycle and the 16th cycle after the feeding of the RD of the core 3 (C5) as a pipe-feeding inhibition interval. The RSL 20C further sets the two cycles in the period between the 14th cycle and the 15th cycle after the feeding of the RD of the core 3 (C5) as an interval in which sharing of the first data bus 6A is inhibited.

Because the RD of the core 3 (C5) is fed during the 13th cycle (EVEN cycle), the feeding deterrence flag setting unit 24 releases all setting of feeding deterrence flags to the core 3 (C0), the core 3 (C1), the core 3 (C4), and the core 3 (C5) to which setting has been made. In accordance with the RD of the core 3 (C5), the DSL 16 outputs the data for the core 3 (C5) in the first data bus 6A during the 21st cycle (EVEN cycle). Accordingly, the preceding data for the core 3 (C1) and the subsequent data for the core (C5) can be sequentially transferred without data interference.

Furthermore, for example, even in the EVEN-cycle pipe-feeding inhibition interval (14th to 16th cycles), the RSL 20C detects an RD of the core 3 (C0) during the 16th cycle (ODD cycle) after the interval in which sharing of the first data bus 6A (14th and 15th cycles) is inhibited. Upon detecting the RD of the core 3 (C0) during the 16th cycle (ODD cycle), the RSL 20C feeds the RD of the core 3 (C0) during the 16th cycle (ODD cycle).

Because the same first data bus 6A is used, the late flag setting unit 22 sets a late flag to the RD of the core 3 (C0) during the ODD cycle in the RSL 20C. When the late flag is set, the RSL 20C sets an interval in which sharing of the first data bus 6A is inhibited by extending the interval to the three cycles in the period from the 17th cycle to the 19th cycle after the feeding of the RD of the core 3 (C1). The RSL 20C further sets the three cycles in the period from the 17th cycle to the 19th cycle after the feeding of the RD of the core 3 (C1) as an ODD-cycle pipe-feeding inhibition interval.

Furthermore, when the late flag is set in association with the ODD-cycle RD of the core 3 (C1), the feeding deterrence flag setting unit 24 sets a feeding deterrence flag, for deterring feeding of ODD-cycle pipe instructions, to the core 3 (C0) and its adjacent core 3 (C1). Accordingly, when ODD-cycle pipe instructions of the core 3 (C0) and the core (C1) are detected, the RSL 20C inhibits feeding of the ODD-cycle pipe instructions.

In accordance with the late flag for the RD of the core 3 (C0), the DSL 16 outputs, as subsequent data for the core 3 (C0) in the first data bus 6A, a one-cycle-delayed ODD-cycle output of the LATE-REG 23B. In the first data bus 6A, the preceding data for the core 3 (C5) and the subsequent data for the core 3 (C0) can be sequentially transferred without data interference. Hereinafter, the above-described process operations are performed repeatedly.

In the fourth embodiment, when a pipe instruction for which the same data bus 6 is used and to which a late flag is set is detected during the same cycle and feeding of a pipe instruction for which the same data bus 6 is used during a different cycle queues, a feeding deterrence flag for preventing feeding of the pipe instruction during the same cycle is set to the core 3 that issues the pipe instruction and its adjacent core 3. When a pipe instruction during the same cycle as that of the core 3 to which the feeding deterrence flag has been set is detected, feeding of the pipe instruction during the cycle is inhibited. Accordingly, even when a pipe instruction for which the same data bus 6 is used and to which a late flag is set is detected during the same cycle, while feeding of a pipe instruction at the cycle is inhibited, a pipe instruction for which the same data bus 6 is used can be fed at a different cycle. Accordingly, irregularity can be avoided in access cycles during which pipe instructions are fed.

In the fourth embodiment, when feeding of a pipe instruction during a cycle different from a cycle of a feeding deterrence flag that has been set is detected, setting of the feeding deterrence flags can be easily released by releasing all the feeding deterrence flags to the cores 3 that have been set.

In the above-described embodiments, the cache memory 2 is divided into four, the MAC 4 is divided into four, and the cache control unit 5 (50, 500) is divided into two. Alternatively, the number of pieces into which the components are divided can be arbitrarily set.

In the above-described embodiments, accesses to the two data memories 2A are controlled during the two types of cycles, i.e., the EVEN cycles and the ODD cycles, using the single control pipeline 10 (10A, 10B). Alternatively, if N data memories 2A are used, cycles in the control pipe lines may be divided into N types of cycles in order to control accesses to the N data memories 2A.

In the above-described embodiments, the data transfer time and the data read time between the core 3 and the data memory 2A are set to four cycles, a pipe-feeding inhibition interval is set to three cycles after the feeding of a pipe instruction, and a bus-sharing inhibition interval is set to two cycles or three cycles after the feeding of a pipe instruction. Alternatively, by appropriately setting and changing the data transfer time and the data read time, appropriate changes can be made in the cycles of the pipe-feeding inhibition interval and the bus-sharing inhibition interval.

In the fourth embodiment, when a late flag is set to a pipe instruction, a feeding deterrence flag is set to the core 3 and its adjacent core 3 that relate to the pipe instruction. However, the cores to which a feeding deterrence flag is set are not limited to the core 3 and the adjacent core 3. A feeding deterrence flag can be set for all the cores 3 in the group that shares the same data bus 6 with the core 3 that issues the request. For example, a flag can be set on a group basis, e.g., the cores 3 (C0, C1, C4, and C5) of the cores 3 (C2, C3, C6, and C7).

Among the above-described processes according to the embodiments, the processes that are described as those that are automatically performed may be manually performed entirely or partly, and the processes that are described as those that are manually performed may be automatically performed entirely or partly. The process procedures, the control procedures, the specific names, and information containing various types of data and parameters according to the embodiments may be arbitrarily changed unless otherwise stated.

According to one aspect of the cache memory control device, the semiconductor integrated circuit, and the cache memory control method that are disclosed in this application, effects can be achieved in which stable data transfer efficiency can be ensured between cache memories and arithmetic processing units without having a complicated circuit structure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A cache memory control device, comprising:
   a plurality of cache memories shared by a plurality of arithmetic processing units to store data from the plurality of arithmetic processing unit;
   a plurality of buses that are shared by the arithmetic processing units and transfers data read from the plurality of cache memories to the arithmetic processing units;
   an instruction execution unit that accesses each of the plurality of cache memories in accordance with cycles time-divided for each of the plurality of cache memories, executes an access instruction from the arithmetic processing unit to access data stored in each of the plurality of cache memories, and transfers data read from each of the cache memories to the bus corresponding to the arithmetic processing unit;
   an instruction feeding unit that receives an access instruction from the arithmetic processing unit and feeds the access instruction to the instruction execution unit while inhibiting feeding of a subsequent access instruction accessing a same cache memory with a preceding access instruction in a period required to execute the preceding access instruction and inhibiting feeding of the subsequent access instruction for which a same bus as that used for the preceding access instruction is used in a predetermined period shorter than the period required to execute the preceding access instruction;
   a late flag setting unit that sets a late flag in association with the subsequent access instruction when the instruction feeding unit feeds the subsequent access instruction in the period required to execute the preceding access instruction, and
   a timing control unit that controls the instruction executing unit such that the instruction executing unit starts transferring data corresponding to the access instruction to which the late flag is set to the bus just after completing transfer of the data corresponding to the preceding access instruction to the bus, when an access instruction to which a late flag is set by the late flag setting unit is executed.

2. The cache memory control device according to claim 1, wherein, when the instruction feeding unit feeds the subsequent access instruction for which the same bus as that used for the preceding access instruction is used in the period required to execute the preceding access instruction, the instruction feeding unit inhibits feeding of the access instruction for which the same bus as that used for the subsequent access instruction in a period required to execute the access instruction.

3. The cache memory control device according to claim 1, wherein, when the instruction feeding unit feeds a subsequent access instruction for which the same bus as that used for the preceding access instruction is used in the period required to execute the preceding access instruction, the instruction feeding unit inhibits feeding of the access instructions that are requested by the arithmetic processing unit that requests the subsequent access instruction and a related arithmetic processing unit is one of the arithmetic processing units that use the same bus as that used by the arithmetic processing unit that requests the subsequent access instruction.

4. The cache memory control device according to claim 3, wherein each arithmetic processing unit is adjacent to the other arithmetic processing unit that requests the subsequent access instruction.

5. A semiconductor integrated circuit, comprising:
   a plurality of cache memories shared by a plurality of arithmetic processing units to store data from the plurality of arithmetic processing unit;
   a plurality of buses that are shared by the arithmetic processing units and transfers data read from the plurality of cache memories to the arithmetic processing units;
   an instruction execution unit that accesses each of the plurality of cache memories in accordance with cycles time-divided for each of the plurality of cache memories, executes an access instruction from the arithmetic processing unit to access data stored in each of the plurality of cache memories, and transfers data read from each of the cache memories to the bus corresponding to the arithmetic processing unit;
   an instruction feeding unit that receives an access instruction from the arithmetic processing unit and feeds the access instruction to the instruction execution unit while inhibiting feeding of a subsequent access instruction accessing a same cache memory with a preceding access instruction in a period required to execute the preceding access instruction and inhibiting feeding of the subsequent access instruction, for which the same bus as that used for the preceding access instruction is used in a predetermined period shorter than the period required to execute the preceding access instruction;
   a late flag setting unit that sets a late flag in association with the subsequent access instruction when the instruction feeding unit feeds the subsequent access instruction in the period required to execute the preceding access instruction, and
   a timing control unit that controls the instruction executing unit such that the instruction executing unit starts transferring data corresponding to the access instruction to which the late flag is set to the bus just after completing transfer of the data corresponding to the preceding access instruction to the bus, when an access instruction to which a late flag is set by the late flag setting unit is executed.

6. A cache memory control method that is performed by a cache memory control device, the cache memory control method comprising:
   accessing each of plurality of cache memories shared by arithmetic processing units according to cycles time-divided for each of the plurality of cache memories to execute an access instruction from one of the arithmetic processing units to one of the cache memories;
   transferring data read from each of the cache memories to one of buses corresponding to the arithmetic processing unit, the buses being shared by the arithmetic processing units to transfer the data read from the plurality of cache memories to the arithmetic processing unit;
   receiving an access instruction from the arithmetic processing unit to the cache memory;
   feeding the access instruction to an instruction execution unit while inhibiting feeding of a subsequent access instruction accessing a same cache memory with a preceding access instruction in a period required to execute the preceding access instruction and inhibiting feeding of the subsequent access instruction for which a same bus as that used for the preceding access instruction is used in a predetermined period shorter than the period required to execute the preceding access instruction;

setting a late flag in association with the subsequent access instruction when the subsequent access instruction in the period required to execute the preceding access instruction is fed, and when an access instruction to which a late flag is set, controlling the feeding such that the feeding includes starting transferring data corresponding to the access instruction to which the late flag is set to the bus just after completing transfer of the data corresponding to the preceding access instruction to the bus.

* * * * *